(12) United States Patent
Monti et al.

(10) Patent No.: US 9,719,748 B2
(45) Date of Patent: *Aug. 1, 2017

(54) METHOD AND APPARATUS FOR FIREARM RECOIL SIMULATION

(71) Applicant: HAPTECH, INC., New Orleans, LA (US)

(72) Inventors: Kyle Monti, Luling, LA (US); Daryl Marse, Luling, LA (US)

(73) Assignee: Haptech, Inc., New Orleans, LA (US)

( * ) Notice: Subject to any disclaimer, the term of this patent is extended or adjusted under 35 U.S.C. 154(b) by 179 days.

This patent is subject to a terminal disclaimer.

(21) Appl. No.: 14/551,526

(22) Filed: Nov. 24, 2014

(65) Prior Publication Data
US 2015/0308780 A1    Oct. 29, 2015

Related U.S. Application Data

(63) Continuation of application No. PCT/US2013/042142, filed on May 22, 2013, which is a continuation of application No. 13/804,429, filed on Mar. 14, 2013, now Pat. No. 9,146,069.

(60) Provisional application No. 61/650,006, filed on May 22, 2012.

(51) Int. Cl.
*F41A 33/00* (2006.01)
*F41A 33/06* (2006.01)
*F41A 33/02* (2006.01)
*G09B 9/00* (2006.01)
*H02K 41/03* (2006.01)

(52) U.S. Cl.
CPC .............. *F41A 33/06* (2013.01); *F41A 33/02* (2013.01); *G09B 9/003* (2013.01); *H02K 41/031* (2013.01)

(58) Field of Classification Search
CPC .......... F41A 33/00; F41A 33/02; F41A 33/04; F41A 33/06; F41G 3/2655; H02K 41/031
See application file for complete search history.

(56) References Cited

U.S. PATENT DOCUMENTS 8,449,346 B2 *   5/2013   Lee ................. F41B 11/644
                                                    124/1
2011/0318715 A1 * 12/2011 Markert ............. F41A 33/06
                                                    434/18

* cited by examiner

*Primary Examiner* — Timothy A Musselman
(74) *Attorney, Agent, or Firm* — Jason P. Mueller; Adams & Reese LLP

(57) ABSTRACT

A method and apparatus for firearm training simulator which simulates realistic recoil of conventional firearms. The method and apparatus incorporates a linear motor and controllable mass for generating recoil. One embodiment includes an adjusting system for adjusting the amount of recoil provided. Also provided are means for simulating semi-automatic and/or full automatic operation of firearms. One embodiment can include a laser emitter which simulates the path for a bullet fired from a firearm that the method and apparatus is simulating.

40 Claims, 21 Drawing Sheets

METHOD AND APPARATUS FOR FIREARM RECOIL SIMULATION

CROSS-REFERENCE TO RELATED APPLICATIONS

This is a continuation of PCT Application Serial No. PCT/US2013/042142, filed on 22 May 2013, which is a continuation of U.S. patent application Ser. No. 13/804,429, filed 14 Mar. 2013, which is a non-provisional of U.S. Provisional Patent Application Ser. No. 61/650,006, filed 22 May 2012, which applications are incorporated herein by reference and priority to/of each application is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

One embodiment relates to simulating of recoil for firearms. More specifically, one embodiment provides a method and apparatus for simulating the recoil of a selected conventional firearm. One embodiment additionally provides a laser to simulate the path of a bullet if the bullet had been fired from a firearm being simulated by the method and apparatus.

Firearms training for military personnel, law enforcement officers, and private citizens increasingly encompasses role playing and decision making in addition to marksmanship. Such training often includes competing against role players and/or responding to situations projected onto a screen in front of the trainee.

Although self-healing screens exist, permitting the use of conventional firearms for such training, the use of such a system requires a location appropriate to the use of conventional firearms. Furthermore, such systems are expensive and can be unreliable. Alternatives to conventional firearms have been developed. These alternatives include paintball, simunitions, and the use of a laser to show the path a bullet would have taken had one been fired.

Such alternatives, however, do not duplicate substantially all of the characteristics of firing an actual weapon with actual ammunition, and the current alternatives limit the extent to which the training will carry over to use of actual firearms. In various embodiments the characteristics of a conventional firearm to be duplicated can include size, weight, grip configuration, trigger reach, trigger pull weight, type of sights, level of accuracy, method of reloading, method of operation, location and operation of controls, and recoil.

Realistic recoil is the most difficult characteristic to duplicate. The inability to get a trainee accustomed to the recoil generated by a particular firearm is one of the greatest disadvantages in the use of various firearm training simulators. Recoil not only forces the firearm shooter to reacquire the sights after shooting, but also forces the shooter to adapt to a level of discomfort proportional to the energy of the particular bullet to be fired by the firearm. Recoil is significantly more difficult to control during full automatic fire than during semi-automatic fire, making the accurate simulation of both recoil and cyclic rate important in ensuring that simulation training carries over to the use of actual firearms.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

SUMMARY

One embodiment provides a firearm training simulator having a recoil emulating the recoil impulse pattern of a particular firearm firing a particular size and type of bullet. In one embodiment the method and apparatus can include a laser beam projector for projecting the path of a bullet fired from the particular firearm being simulated.

In various embodiments the method and apparatus can also simulate additional operations of a particular firearm which operations include sighting, positioning of the firearm controls, and methods of operation of the firearm. Particular firearms that can be simulated include M-4A1, AR-15, or M-16 rifles, along with other conventional firearms.

In one embodiment the method and apparatus can be controlled by a combination of the trigger assembly, bolt, and linear motor. In various embodiments the method and apparatus is capable of simulating modes of semi-automatic fire and full automatic firing. In various embodiments the cyclic rate of full automatic firing mode simulation is substantially the same cyclic rate of a conventional automatic rifle.

One embodiment provides a laser substantially tracking the path of an actual bullet being fired from a firearm being simulated. One laser emitter can be housed within the barrel of the firearm simulating body. In one embodiment the laser emitter can be operatively connected to a controller which is also operatively connected to a recoil. One embodiment of the switch may be a roller switch structured to be actuated by a switching rod extending forward from the bolt. When the bolt moves forward in response to pulling the trigger, the switching rod engages the roller of the switch, thereby depressing the switch and actuating the laser. Another embodiment uses a proximity switch mounted in a location wherein a magnet may be brought into contact with it upon forward movement of the bolt. A preferred location is adjacent to the juncture between a barrel and upper receiver. A magnet affixed to the bolt is structured to be brought into proximity with the proximity switch when the bolt is in its forwardmost position, thereby causing the proximity switch to actuate the laser.

One embodiment provides a method and apparatus wherein the level of recoil imparted to the user may be programmed by the user.

One embodiment provides a method and apparatus capable of both semi-automatic and full automatic operation.

One embodiment provides a method and apparatus wherein different cyclic rate of full automatic fire may be programmed by the user.

One embodiment provides a method and apparatus including a laser assembly projecting laser substantially along the path of a bullet that would have been fired from the firearm being simulated.

One embodiment provides a method and apparatus simulating the recoil of a conventional firearm using a linear motor controlling a sliding mass and operatively coupled to a controller.

A linear motor can be thought of as an electric motor that has had its stator and rotor "unrolled" so that, instead of producing a torque (i.e., through rotation), it produces a linear force along its longitudinal length. The most common mode of operation for conventional linear motors is as a Lorentz-type actuator, in which the applied force is linearly proportional to the current and the magnetic field.

Many designs have been put forward for linear motors, falling into two major categories, low-acceleration and high-acceleration linear motors. Low-acceleration linear motors are suitable for maglev trains and other ground-based transportation applications. High-acceleration linear motors are normally rather short, and are designed to accelerate an object to a very high speed, for example see the railgun. They are usually used for studies of hypervelocity collisions, as weapons, or as mass drivers for spacecraft propulsion. The high-acceleration motors are usually of the AC linear induction motor (LIM) design with an active three-phase winding on one side of the air-gap and a passive conductor plate on the other side. However, the direct current homopolar linear motor railgun is another high acceleration linear motor design. The low-acceleration, high speed and high power motors are usually of the linear synchronous motor (LSM) design, with an active winding on one side of the air-gap and an array of alternate-pole magnets on the other side. These magnets can be permanent magnets or energized magnets. The Transrapid Shanghai motor is an LSM.

Linear motors employ a direct electromagnetic principle. Electromagnetic force provides direct linear movement without the use of cams, gears, belts, or other mechanical devices. The motor consists of only two parts: the slider and the stator. The slider is a precision assembly that consists of a stainless steel tube, which is filled with neodymium magnets, that has threaded attachment holes on each end. The stator, consisting of coils, the bearing for the slider, position sensors and a microprocessor board, is designed for use in harsh industrial environments.

A solenoid is a coil wound into a tightly packed helix. The term solenoid refers to a long, thin loop of wire, often wrapped around a metallic core, which produces a magnetic field when an electric current is passed through it. The term solenoid refers specifically to a coil designed to produce a uniform magnetic field in a volume of space (where some experiment might be carried out). In engineering, the term solenoid may also refer to a variety of transducer devices that convert energy into linear motion. The term is also often used to refer to a solenoid valve, which is an integrated device containing an electromechanical solenoid which actuates either a pneumatic or hydraulic valve, or a solenoid switch, which is a specific type of relay that internally uses an electromechanical solenoid to operate an electrical switch; for example, an automobile starter solenoid, or a linear solenoid, which is an electromechanical solenoid.

Electromechanical solenoids consist of an electromagnetically inductive coil, wound around a movable steel or iron slug (termed the armature). The coil is shaped such that the armature can be moved in and out of the center, altering the coil's inductance and thereby becoming an electromagnet. The armature is used to provide a mechanical force to some mechanism (such as controlling a pneumatic valve). Although typically weak over anything but very short distances, solenoids may be controlled directly by a controller circuit, and thus have very low reaction times. The force applied to the armature is proportional to the change in inductance of the coil with respect to the change in position of the armature, and the current flowing through the coil (see Faraday's law of induction). The force applied to the armature will always move the armature in a direction that increases the coil's inductance. The armature is a ferromagnetic material.

Free recoil is a vernacular term or jargon for recoil energy of a firearm not supported from behind. Free recoil denotes the translational kinetic energy ($E_t$) imparted to the shooter of a small arm when discharged and is expressed in joule (J) and foot-pound force (ft·lbf) for non-SI units of measure. More generally, the term refers to the recoil of a free-standing firearm, in contrast to a firearm securely bolted to or braced by a massive mount or wall.

Free recoil should not be confused with recoil. Free recoil is the given name for the translational kinetic energy transmitted from a small arm to a shooter. Recoil is a name given for conservation of momentum as it generally applies to an everyday event.

Free recoil, sometimes called recoil energy, is a byproduct of the propulsive force from the powder charge held within a firearm chamber (metallic cartridge firearm) or breech (black powder firearm). The physical event of free recoil occurs when a powder charge is detonated within a firearm, resulting in the conversion of chemical energy held within the powder charge into thermodynamic energy. This energy is then transferred to the base of the bullet and to the rear of the cartridge or breech, propelling the firearm rearward into the shooter while the projectile is propelled forward down the barrel, with increasing velocity, to the muzzle. The rearward energy of the firearm is the free recoil and the forward energy of the bullet is the muzzle energy.

The concept of free recoil comes from the tolerability of gross recoil energy. Trying to figure the net recoil energy of a firearm (also known as felt recoil) is a futile endeavor. Even if you can calculate the recoil energy loss due to: muzzle brake; recoil operated action or gas operated action; mercury recoil suppression tube; recoil reducing butt pad and or hand grip; shooting vest and or gloves, the human factor is not calculable.

Free recoil can be thought of as a scientific measurement of recoil energy. The comfort level of a shooter's ability to tolerate free recoil is a personal perception. Just as it is a person's, personal perception of how comfortable he or she feels to room or outside temperature.

There are many factors that determine how a shooter will perceive the free recoil of his or her small arm. Some of the factors are, but not limited to: body mass; body frame; experience; shooting position; recoil suppression equipment; small arm fit and or environmental stressors.

There are several different ways to calculate free recoil. However, the two most common are the momentum short and long forms.

Both forms will yield the same value. The short form uses one equation as where the long form requires two equations. With the long form you will first find for the fire arm velocity. With the velocity known for the small arm, the free recoil of the small arm can be calculated using the translational kinetic energy equation. A calculation can be done as follows:

Momentum Short Form:

$$E_{tgu} = 0.5 * m_{gu} * [[(m_p * v_p) * (m_c * v_c)]/1000]^2 / m_{gu}^2$$

Momentum Long Form:

$$v_{gu}=[(m_p*v_p)+(m_c*v_c)]/(1000*m_{gu}) \text{ and}$$

and $$E_{tgu}=0.5*m_{gu}*v_{gu}^2$$

Where as:

$E_{tgu}$ is the translational kinetic energy of the small arm as expressed by the joule (J).

$m_{gu}$ is the weight of the small arm expressed in kilograms (kg).

$m_p$ is the weight of the projectile expressed in grams (g).

$m_c$ is the weight of the powder charge expressed in grams (g).

$v_{gu}$ is the velocity of the small arm expressed in meters per second (m/s).

$v_p$ is the velocity of the projectile expressed in meters per second (m/s).

$v_c$ is the velocity of the powder charge expressed in meters per second (m/s).

1000 is the conversion factor to set the equation equal to kilograms.

In various embodiments the linear motor comprises a sliding mass/rod including a plurality of individual magnets each having north and south poles. In various embodiment the plurality of individual magnets are longitudinally aligned with like poles of adjacent magnets facing like poles. In various embodiment the plurality of individual magnets are longitudinally aligned with unlike poles of adjacent magnets facing unlike poles. In various embodiments the plurality of individual magnets in the sliding mass/rod comprise 2, 3, 4, 5, 6, 7, 8, 9, 10, 11, 12, 13, 14, 15, 16, 19, 20, 25, 30, 35, 40, 45, and/or 50 magnets. In various embodiments the number of magnets is between the range of any two of the above listed numbers.

In various embodiments the linear motor includes a plurality of magnetic coils independently controllable with respect to each other regarding timing and/or amount of current flow. In various embodiments the plurality of independently controllable magnetic coils are each independently controllable regarding the timing and/or amount of current flow and/or direction of current flow.

In various embodiments each of the plurality of independently controllable magnetic coils can include a plurality of sub-coil sections that are spaced apart from each other but connected electrically in series causing the electrically serially connected spaced apart sub-coil sections to form a single independently controllable magnetic coil. In various embodiments at least one sub-coil of a first independently controllable magnetic coil of the plurality of coils is intermediately spaced between two spaced apart sub-coils of a second independently controllable magnetic coil of the plurality of coils.

In various embodiments the linear motor comprises a plurality of independently controllable magnetic coils which are longitudinally aligned with each other and closely spaced, wherein at least two adjacent independently controllable magnetic coils are energized to create oppositely polarized magnetic fields. In various embodiments the linear motor comprises a plurality of independently controllable magnetic coils which are longitudinally aligned, wherein adjacent independently controllable magnetic coils are simultaneously energized to create oppositely polarized magnetic fields.

In various embodiments the linear motor comprises a plurality of independently controllable magnetic coils which are longitudinally aligned with each other and closely spaced, slidingly connected to a sliding mass of magnets which sliding mass is comprised of a plurality of longitudinally aligned adjacent magnets, wherein the linear motor causes movement of a sliding mass of magnets by varying current through individual independently controllable coils in relation to the proximity of a particular magnet in the plurality of magnets to a particular coil in the plurality of independently controllable magnetic coils.

In various embodiments the plurality of individually controllable magnetic coils in the plurality of coils include at least 2, 3, 4, 5, 6, 7, 8, 9, 10, 11, 12, 13, 14, 15, 16, 19, 20, 25, 30, 35, 40, 45, and/or 50 independently controllable coils. In various embodiments the number of independently controllable magnetic coils is between the range of any two of the above listed numbers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION

Figure 1:
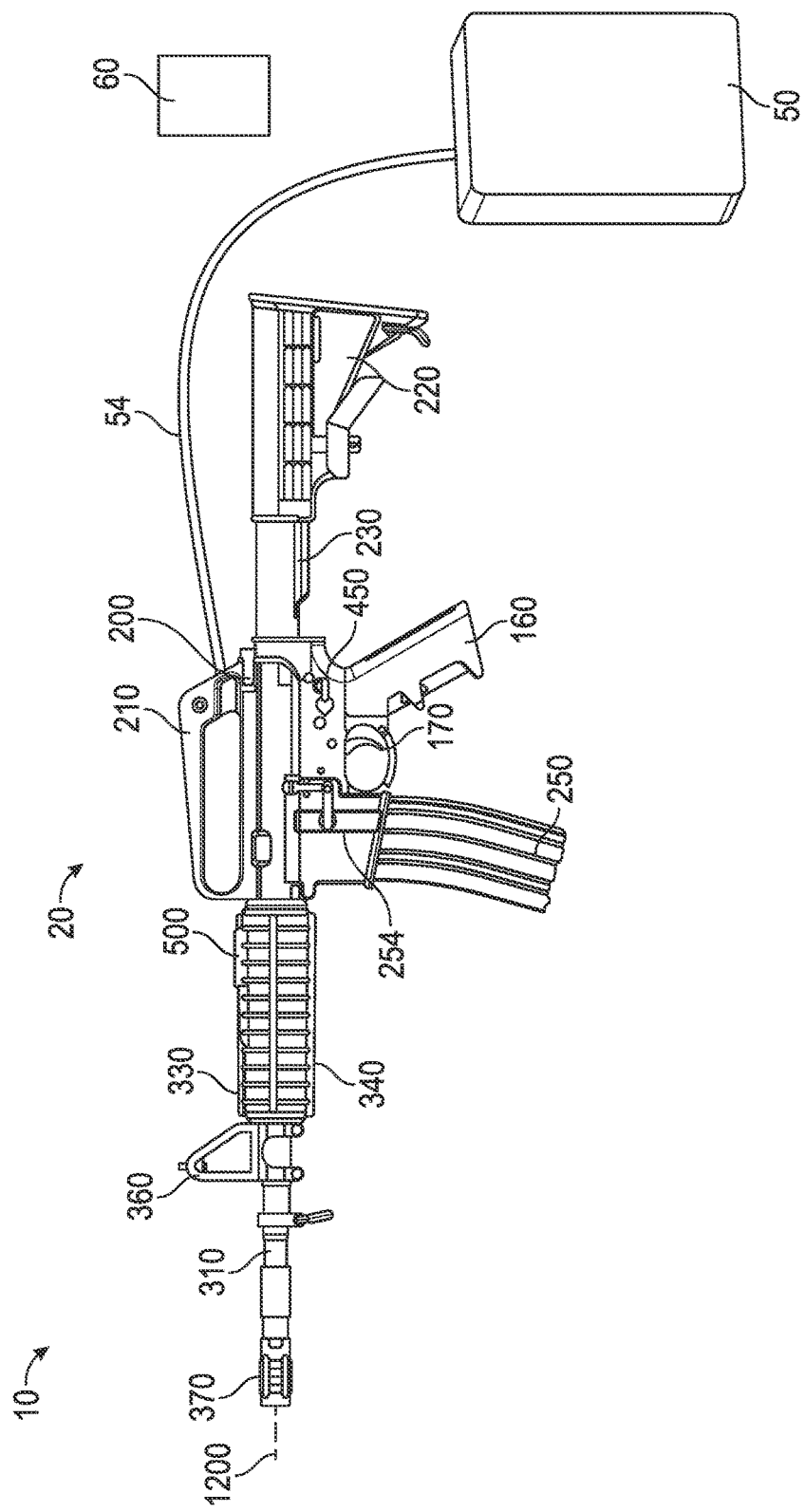
FIG. 1 is a side view of one embodiment of a firearm training system.

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

One embodiment provides a firearm simulator body 20 which simulates an M-4A1, AR-15, or M-16 rifle. The firearm simulator body 20 includes upper receiver 120 and lower receiver 140. Like a conventional M-16, upper receiver 120 can be pivotally secured to lower receiver 140 by a screw or pin.

Lower receiver 140 can include a pistol grip 160, a trigger 170 disposed in front of the pistol grip 160, and a selector 450 disposed above the pistol grip 160. A shoulder stock 220 is secured to lower receiver 140.

A barrel assembly 300 is mounted to the front portion of upper receiver 120. The barrel assembly 300 includes a barrel 310 which is directly secured to upper receiver 120. An upper handguard 330 and lower handguard 340 are secured to barrel assembly. A front sight block 360 is disposed around barrel 310.

FIG. 1 is a side view of one embodiment of a firearm training system 10.

Figure 2:
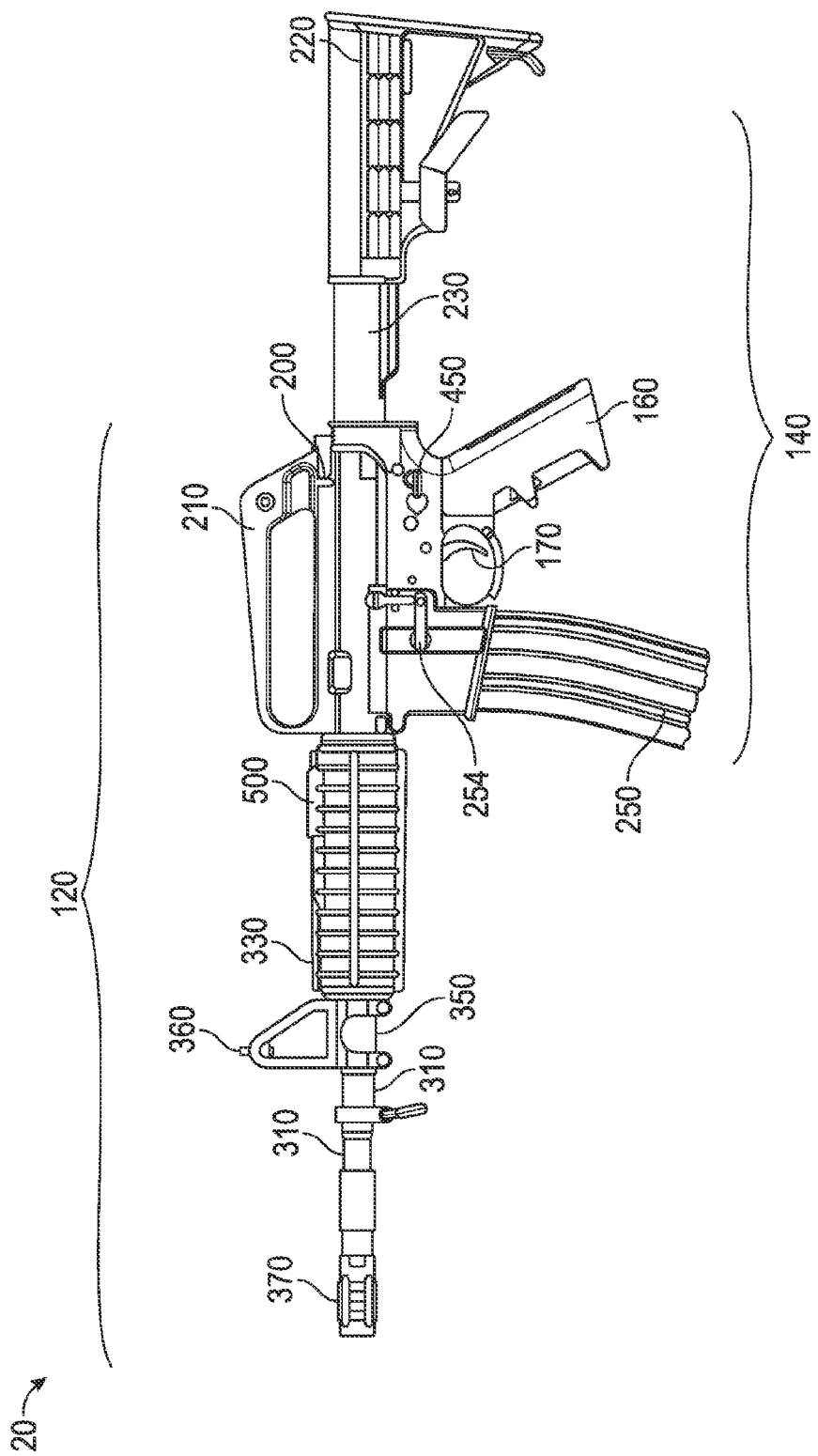
FIG. 2 is a side view of simulated firearm body of the system shown in FIG. 1.
Figure 3:
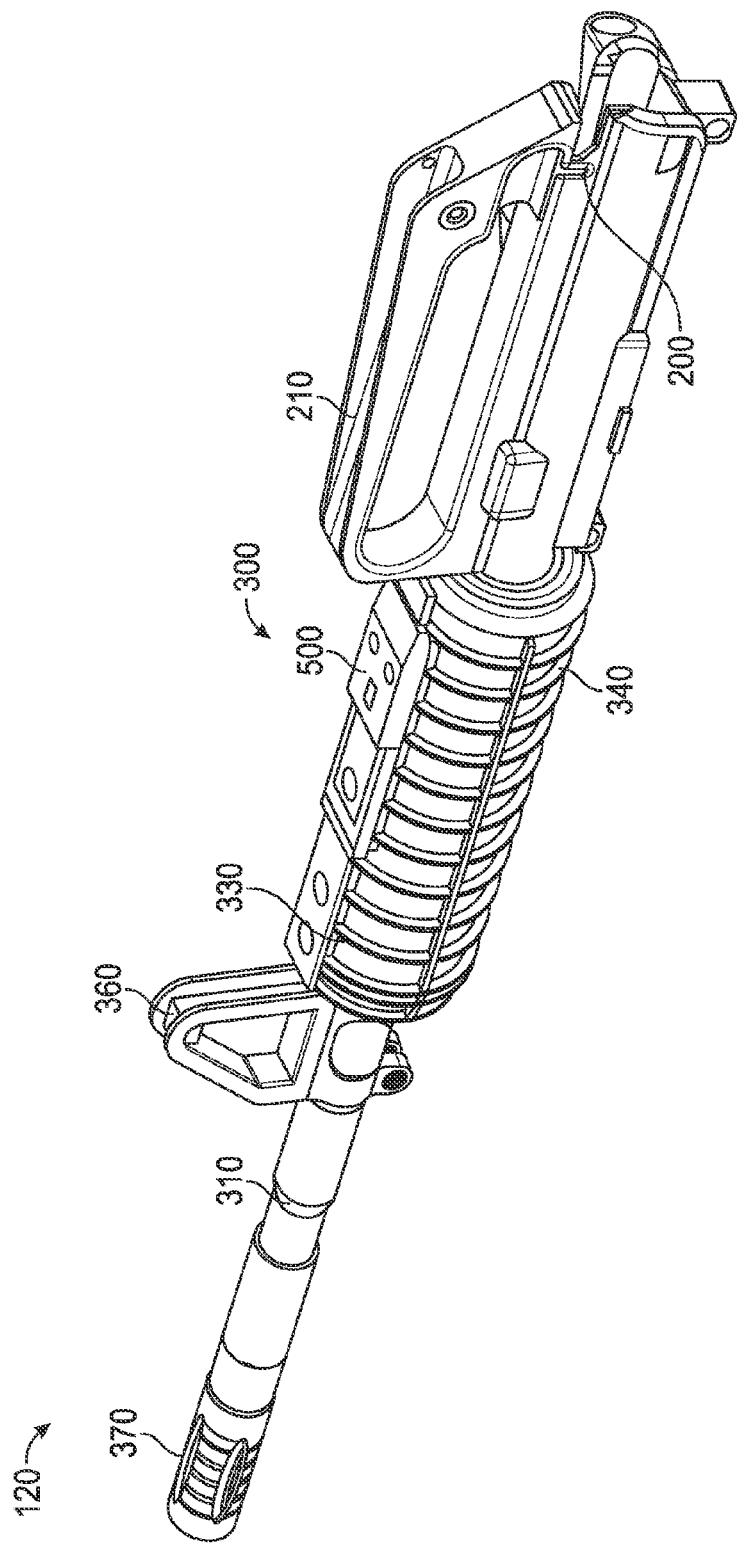
FIG. 3 is a perspective view of the upper assembly of the simulated firearm body of FIG. 2.
Figure 4:
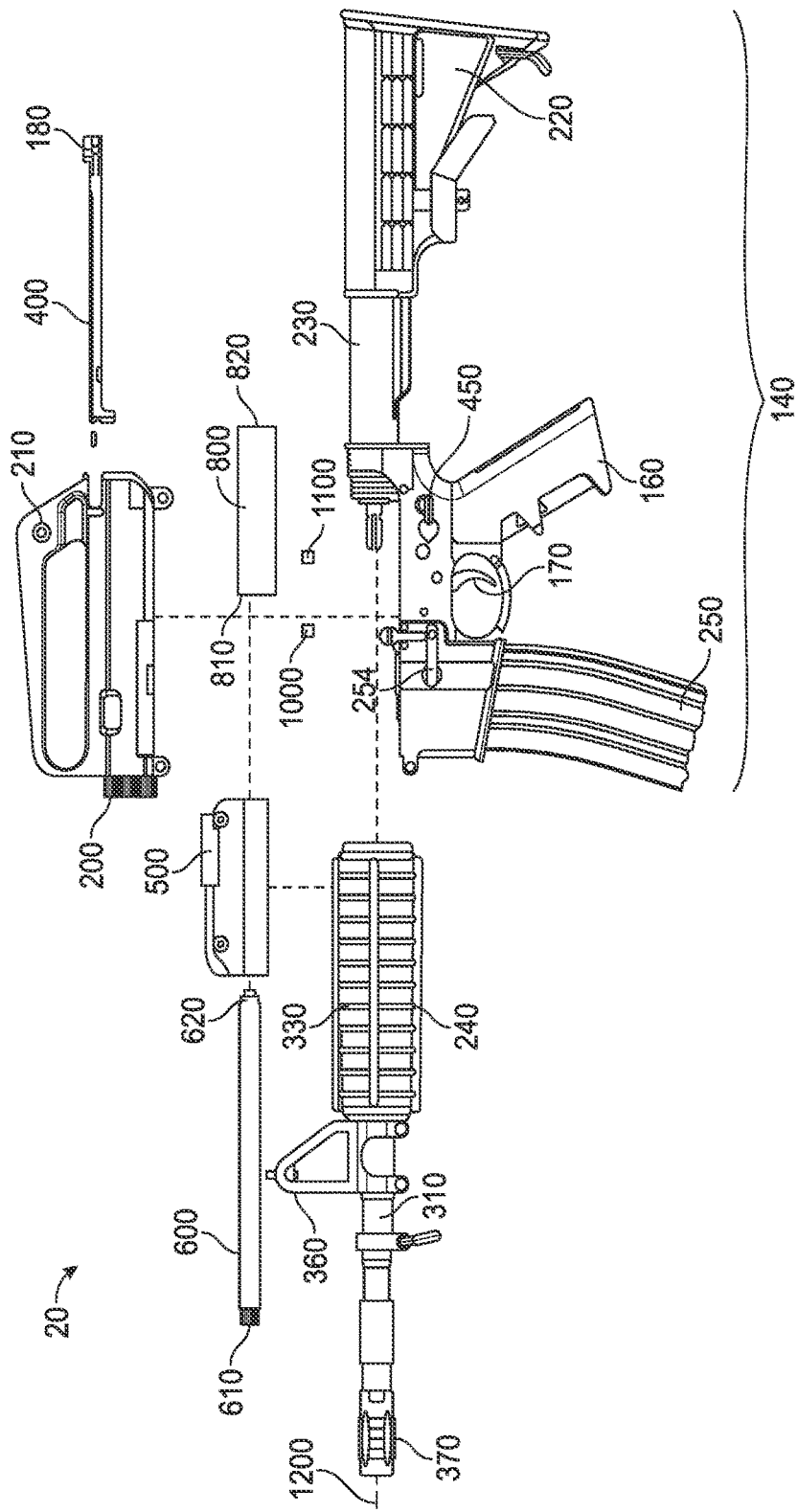
FIG. 4 is an exploded view of the simulated firearm body of FIG. 2.

FIG. 2 is a side view of simulated firearm body 20. FIG. 3 is a perspective view of upper assembly 120. FIG. 4 is an exploded view of simulated firearm body 20.

Firearm training system 10 can include a simulated firearm body 20 having a linear motor 500 operatively connected to a slider mass 600, and a controller 50 operatively connected to the linear motor 500.

Simulated firearm body 20 can include upper assembly 120 and lower assembly 140. Upper assembly 120 can include barrel assembly 300, barrel 310, along with upper 330 and lower 340 hand guards.

Lower assembly 140 can include stock shoulder stock 220, buffer tube 230, and pistol grip 160. Pistol grip 160 can include trigger 170. Cartridge 250 can be detachably connectable to lower assembly 140.

Linear motor 500 can be attached to upper assembly 120 via connector assembly 700. Connector assembly 700 can include first end 710, second end 720, connector plates 721 and 722, connector tube 740 having bore 750. Connector plate 721 includes fastener openings 730, and connector plate 722 includes fastener openings 732.

Figure 5:
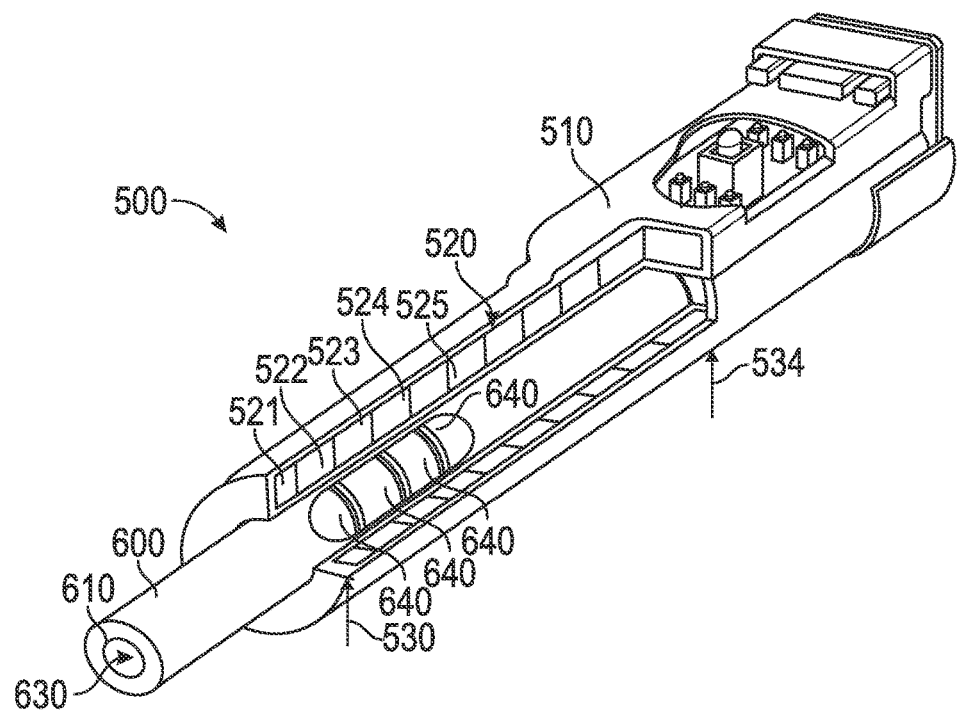
FIG. 5 is a perspective view of one embodiment of a linear motor and sliding mass.
Figure 6:
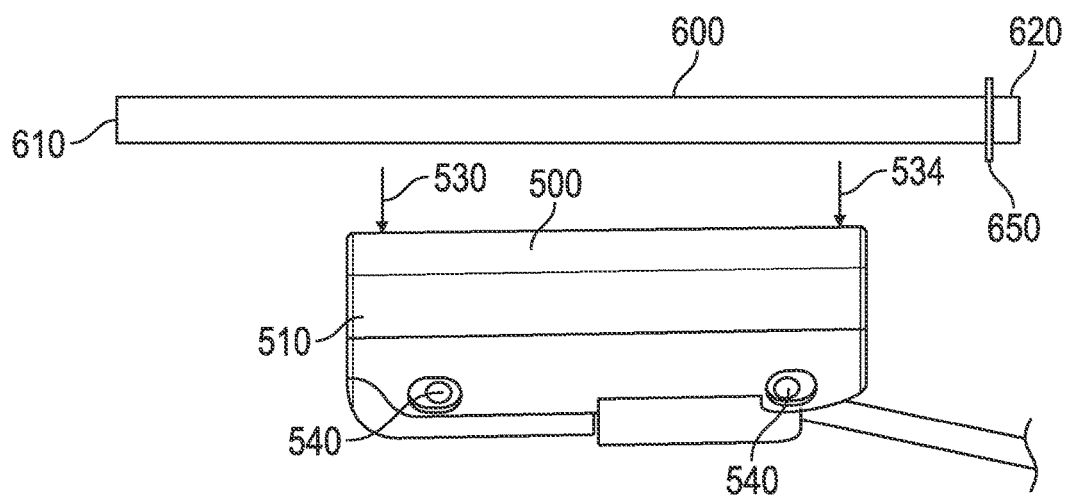
FIG. 6 is an exploded side view of one embodiment of a linear motor and sliding mass.
Figure 7:
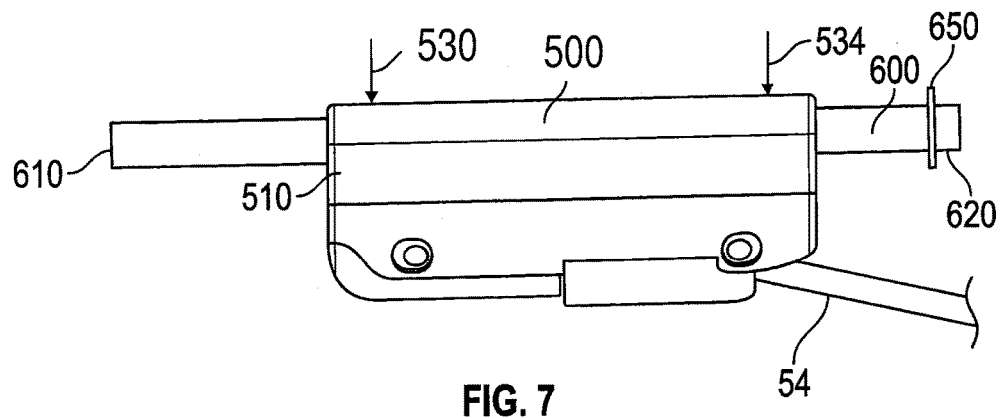
FIG. 7 is an assembled side view of the linear motor and sliding mass of FIG. 6.

FIG. 5 is a perspective view of one embodiment of a linear motor 500 and sliding mass 600. FIG. 6 is an exploded side view of linear motor 500 and sliding mass 600. FIG. 7 is an assembled view of the linear motor 500 and sliding mass 600.

Linear motor 500 includes a plurality 520 of separately controllable energized coils 521, 522, 523, 524, 525, 526, 527, 528, 529, 530, etc. which electomagnetically interact with the plurality of magnets 640 in mass 600. By controlling the timing, direction of current, and power of magnetic attraction of particular magnetic coils in plurality of separately controllable magnetic coils 520 movement, acceleration, velocity, and position of mass 600 can be controlled to obtain a desired momentum/impulse curve over time which approximates a particular impulse curve over time for a particular firearm being simulated.

Linear motor 500 can include a mass 600 which is slidably connected to linear motor 500. Mass 600 can include first end 610, second end 620, and bore 630. A plurality of magnets 640 can be included inside of bore 630. Linear motors 500 are conventionally available but have not been used in simulated firearms for controlling recoil force.

Figure 8:
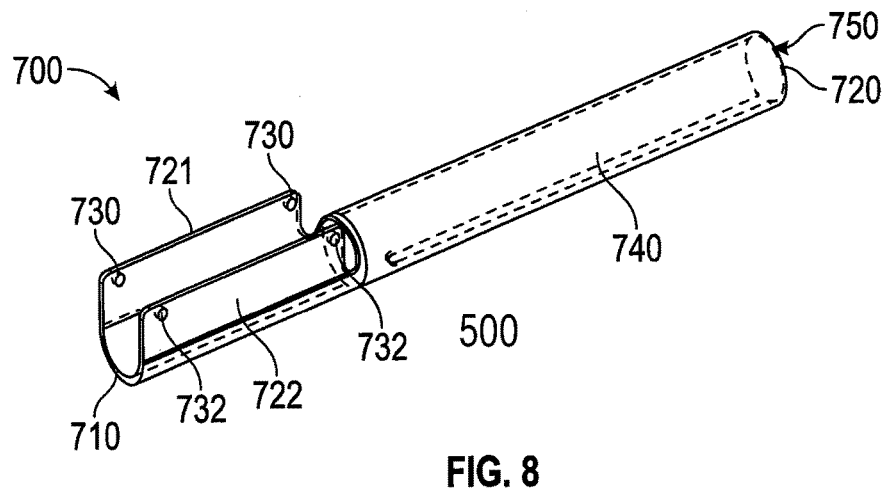
FIG. 8 is a perspective view of one embodiment of a support bracket for the linear motor and sliding mass.

FIG. 8 is a perspective view of one embodiment of a support 700 for linear motor 500 and sliding mass 600. Support can include first end 710 and second end 720. On first end can be first and second connector flanges 721,722. First connector flange 721 can include a plurality of connector openings 730. Second connector flange 722 can include a plurality of connector openings 732. Coming from second end 720 can be tubular section 740 having a tubular bore 750. Linear motor 500 can be mounted to support 700 via plurality of openings 730 and 732 being connected to plurality of connector openings 540. After mounting to support 700, linear motor 500 can cause sliding mass 600 to controllably move (e.g., slide, accelerate, etc.) inside of and relative to bore 750.

In one embodiment stop 800 can be employed to increase free recoil from sliding mass 600. A mechanical stop 800 can be employed inside the simulated firearm body 20 to "rigidly" (i.e., more quickly negatively accelerate to zero sliding mass 600 than linear motor 500 is capable of) at the end of allowed length of travel 660. Such quick stop produces an enhanced recoil effect on user 5 by increasing the maximum generated recoil force on the user 5. Because linear motor 500 employs a magnetic sliding mass 600 with an electromagnetic stator, there is a coupling between the two and a corresponding maximum acceleration and deceleration that the device can achieve. To such limitation, mechanical stop 800 can be employed. Since linear motor 500 normally brakes sliding mass 500 by reversing the driving magnetic field originally used to accelerate sliding mass 600 in the opposite direction, such this feature is not required for stopping at the end of the length of travel 660. Instead braking is left up to contact between sliding mass second end 620 and mechanical stop first end 810 inside lower assembly 140. This allows for much faster breaking times for sliding mass 600 than linear motor 500 could, with such faster braking or deceleration creating larger reactive forces from sliding mass 600 and thus a larger free recoil value produced by system 10 at this point in time and position for sliding mass 600.

In various embodiments, during an emulated firing cycle, linear motor 500 can control movement of sliding mass 600 causing sliding mass 600 to continue to acceleration until the last 1 percent of the entire stroke of sliding mass 600 as sliding mass 600 moves towards collision with mechanical stop 800. In various embodiments acceleration can be increased until the last 2, 3, 4, 5, 10, 15, 20, 25, 30, 35, and/40 percent of the entire stroke of sliding mass 600 as sliding mass 600 moves towards collision with mechanical stop 800. In various embodiments the control of increased acceleration can be until the range of any two of the above referenced percentages percent of the entire stroke of sliding mass 600 as sliding mass 600 moves towards collision with mechanical stop 800.

In various embodiments, during an emulated firing cycle, linear motor 500 can control movement of sliding mass 600 causing sliding mass 600 to continue acceleration until 1 millisecond before sliding mass 600 collides with mechanical stop 800. In various embodiments acceleration can be increased until 2, 3, 4, 5, 6, 7, 8, 9, 10, 12, 14, 15, 16, 18, and/or 20 millisecond before sliding mass 600 collides with mechanical stop 800. In various embodiments the control of increased acceleration can be until the range of any two of the above referenced time periods before sliding mass 600 collides with mechanical stop 800.

Simulated firearm body 20 can include a selector switch 450 operatively connected to controller 50 for controlling the type of operation firearm training system 10. For example, selector switch 450 can have a plurality of modes of simulation such as: (1) safety; (2) semi automatic firing mode; (3) fully automatic firing mode; and (4) burst firing mode.

To use firearm training system 10 a user selects the position of selector switch 450, aims simulated firearm body 20 at a target, and pulls trigger 170. When trigger 170 is pulled, controller 50 will cause linear motor 500 to kinematically control sliding mass 600 to create reactionary forces which will be transmitted to user holding simulated firearm body 20. The reactionary forces created by controlling sliding mass 600 can be controlled to be substantially similar in time and amount for particular ammunition being simulated as being fired from the firearm being simulated.

In one embodiment a time versus force diagram of a particular round of ammunition being fired from a particular firearm to be simulated can be identified, and controller 50 can be programmed to control linear motor 500 to control movement of sliding mass 600 to create substantially the same forces over time by controlling the acceleration versus time of sliding mass. Because force is equal to the product of acceleration multiplied by mass, controlling acceleration versus time also controls force versus time.

In one embodiment a plurality of simulation data point sets (such as force versus time values) can be generated. In one embodiment a particular type of ammunition can be tested in a firearm to be simulated and a data set of apparent recoil force versus time can be generated. In one embodiment a plurality of measurements are taken over a plurality of times. In one embodiment a program for linear motor can be created to cause reaction forces of sliding mass 600 to substantially match in both time and amplitude such emulated force diagram for a plurality of points. In one embodiment at least 3 points are matched.

In various embodiments at least 3, 4, 5, 6, 7, 8, 9, 10, 11, 12, 14, 15, 16, 17, 18, 19, 20, 25, 30, 35, 40, 45, 50, 60, 70, 80, 90, and/or 100 simulation point data sets can be substantially matched. In various embodiments a range of between any two of the above specified number of simulation point data sets can be substantially matched.

In one embodiment system 10 can be used to emulate a force versus time curve that is estimated to occur with a particular firearm firing a particular size and type of ammunition being simulated.

Recoil can be thought of as the forces that a firearm places on the user firing the firearm. Such recoil forces are dependant upon the size and construction of the firearm, along with the characteristics of the bullet being fired from the firearm. The recoil imposed on a user of the same firearm can be different when the firearm fires a first type of ammunition compared to a second type of ammunition.

In one embodiment linear motor 500 and sliding mass 600 combined have a total mass which approximates the mass of the particular firearm being simulated. In one embodiment simulated firearm body 20 which includes linear motor 500 and sliding mass 600 combined have a total mass which approximates the mass of the particular firearm being simulated. In various embodiments either the linear motor 500 and/or sliding mass 600 combined have a total mass (and/or the simulated firearm body 20 which includes linear motor 500 and sliding mass 600 combined) have a total mass which is about 65, 70, 75, 80, 85, 90, 95, and/or 100 percent of the mass of the particular firearm being simulated. In various embodiments a range between any two of the above referenced percentages can be used.

In one embodiment is provided a substantially balanced simulated firearm body 20. By locating linear motor 500 in the front portion of simulated firearm body 20, better weight balance as well as a more realistic starting position for the simulated reactive force vector can be achieved. By positioning sliding mass 600 movement in this way, barrel 300 weight and center of gravity of simulated firearm body 20 will be more realistic to user 5 when system 10 is idle and trigger 170 is not being pulled. This is due to the starting position of sliding mass 600. In one embodiment barrel 310 material being used in upper assembly 120 will not be steel, upper assembly 120 may feel unrealistic to user 5 due to a change in weight distribution compared to an upper assembly for an actual firearm being simulated. To solve this problem, during the initial stage of a recoil simulation cycle, a portion of sliding mass 600 can rest inside barrel 310. Such portion of sliding mass simulates this extra "missing" weight in barrel 310 with the extra weight from the stator of linear motor 500 assisting as well. When user fires system 10, sliding mass 600 moves from barrel 310 towards the rear of simulated firearm body 20 and is stopped by stop 800 that is even with the beginning of the stock. Sliding mass 600 then returns to its initial position and creates a seamless effect for user 5 that the weight distribution of the gun "feels" correct when the gun is not being fired.

In different embodiments, the location of linear motor 500 can be moved from the hand grip position, such as in stock 220, or farther up into the receiver if necessary.

Figure 9:
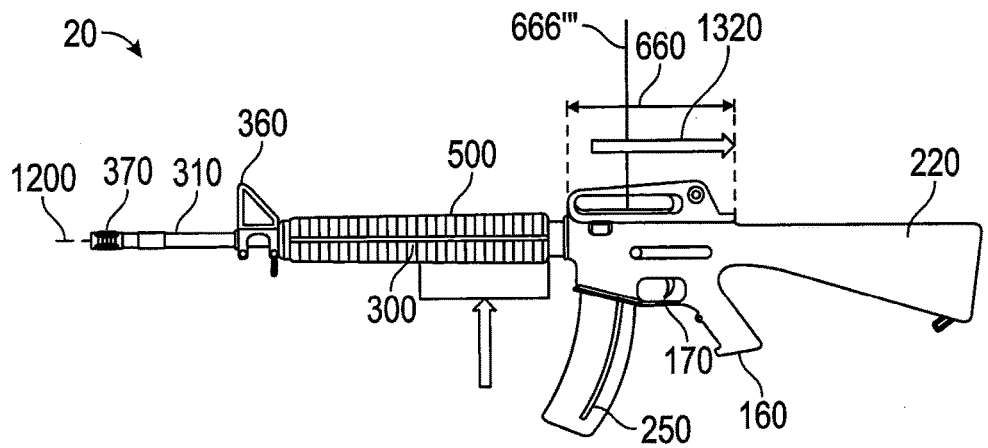
FIG. 9 is a side view of one embodiment of a simulated firearm body.

FIG. 9 is a side view of one embodiment of a simulated firearm body 20. The amount of linear travel of sliding mass is 600 is schematically indicated by arrows 660. In this view, the actual position 666 of second end 620 of sliding mass 600 is schematically shown by "time dependent" vertical line 666''' indicating the transient position of second end 620 of sliding mass 600 in length of travel 660. Arrow 1320 schematically represents a time dependent recoil force which is created by time dependent acceleration of sliding mass 600 by linear motor 500. Clip 650 can be removed from sliding mass 600 before or after installation of linear motor 500 to allow, if desired, during control of sliding mass 600, first and second ends 610, 620 of sliding mass 600 to enter plurality of coils 520 of linear motor 500 between first and second ends 530,534 of plurality of coils 520.

Figure 10:
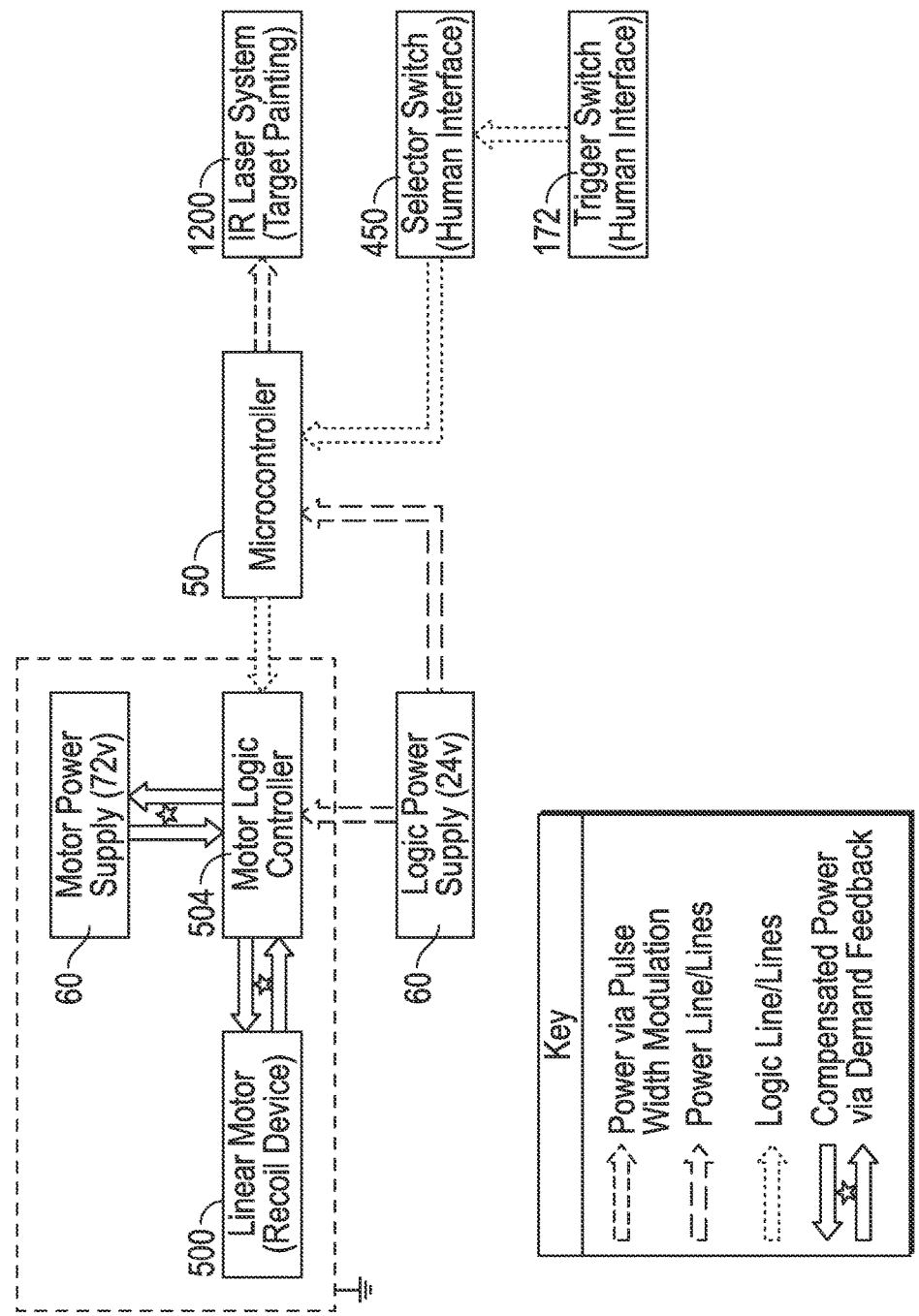
FIG. 10 is a schematic flow diagram of various operation of the simulated firearm system shown in FIG. 1.

FIG. 10 is a schematic flow diagram of various operation of the simulated firearm system shown in FIG. 1. In one embodiment controller 50 can be programmed to control linear motor 500 to control kinematic movement of sliding mass 600 within length of free travel 660 of sliding mass 600 to cause sliding mass to create a desired reactionary force versus time curve, where such force versus time curve simulates a force versus time curve of a particular bullet fired in a particular firearm being simulated. Linear motor 500, which includes controlled sliding mass 600 along with motor logic controller 504. Motor logic controller 504 is operatively connected to controller 50. A power supply 60 (e.g., 24 volts) can be connected to both linear motor's logic controller 504 and controller 50. Because of the larger current demand of the linear motor 500 stator, a separate power supply 60 (e.g., 72 volts) can be connected to linear motor 500.

Sequencing

FIGS. 11-15 are sequencing side views showing the sliding mass 600 of the linear motor 500 at four different positions relative to simulated firearm body 20. In one embodiment system 10 is programmed to simulate recoil for different ammunition types that a user 5 may use in a particular rifle. Programming of system 10 can be accomplished by measuring the force vs. time of an actual round in a particular weapons system to be simulated by system 10 and by using the "free recoil" formula to determine the energy produced by the actual firearm system to be simulated. Once the force vs. time of the actual firearm system to be simulated is known and the free recoil of this actual system is known, then system 10 can be programmed to cause sliding mass 600 to create reactionary forces to substantially match in at least a first plurality of preselected data points the same or similar force vs. time and free recoil energy can be delivered to user 5 giving the same perceived recoil as the live ammunition fired from the actual firearm being simulated.

Accordingly, by changing the stroke distance, velocity, acceleration, and/or deceleration at preselected time intervals or points of sliding mass 600, the reactive recoil force imparted to user 5 from simulated firearm body 20 can be controlled. This reactive recoil force can be controlled to mimic or simulate:

(1) the recoil force generated by a particular type of ammunition round in the particular firearm being simulated;

(2) the recoil force generated by different types of ammunition rounds in the particular firearm being simulated; which different types of ammunition rounds may use more gun powder/less gun powder or use a higher weight bullet/lower weight bullet or some combination of both.

The different types of recoil forces can be simulated by merely having linear motor 500 change the dynamic movements of sliding mass 600 over time. For example if a larger force is desired at a particular point in time during the recoil time period at such particular point in time linear motor merely increases the instantaneous acceleration of sliding mass 600 to cause such reactionary force.

Figure 11:
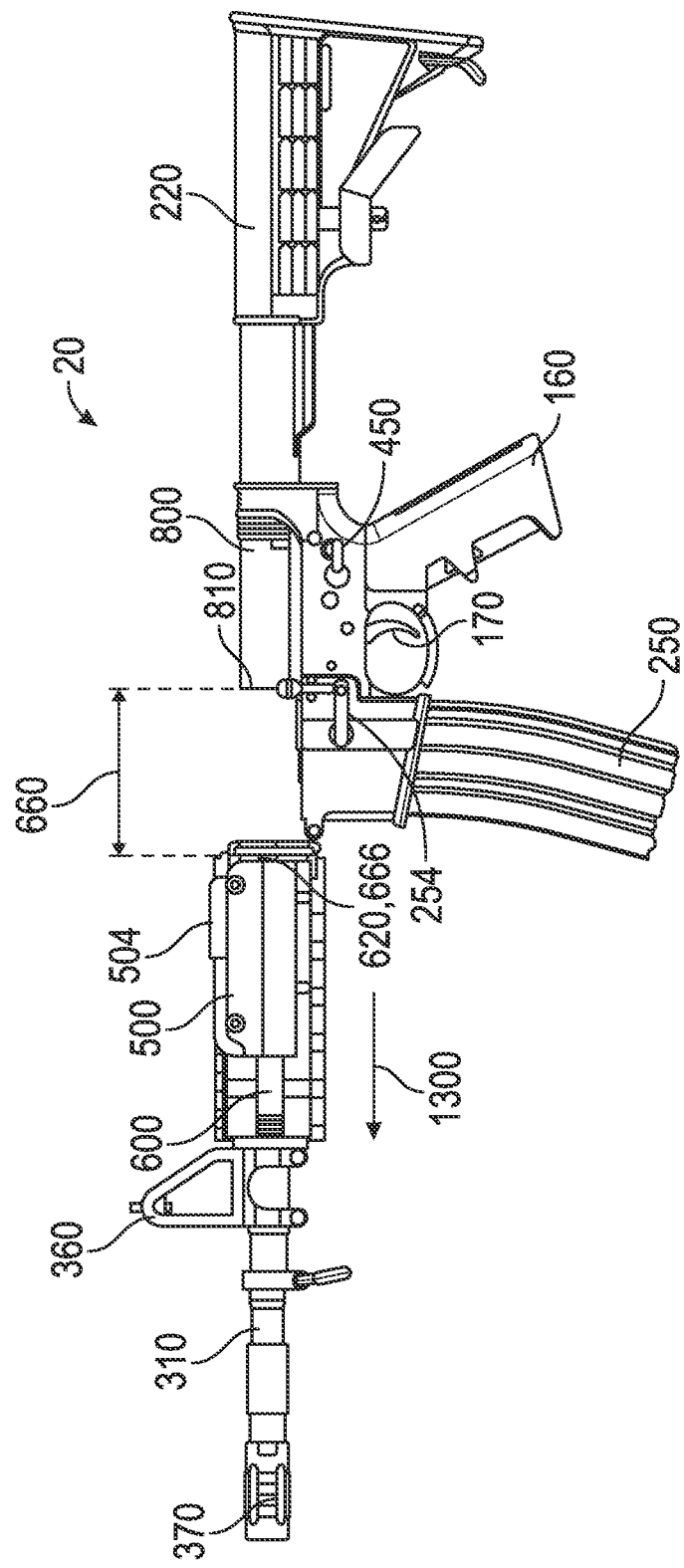
FIG. 11 is a sequencing side view showing the sliding mass of the linear motor at an initial position relative to simulated firearm body in a simulation recoil cycle.
Figure 12:
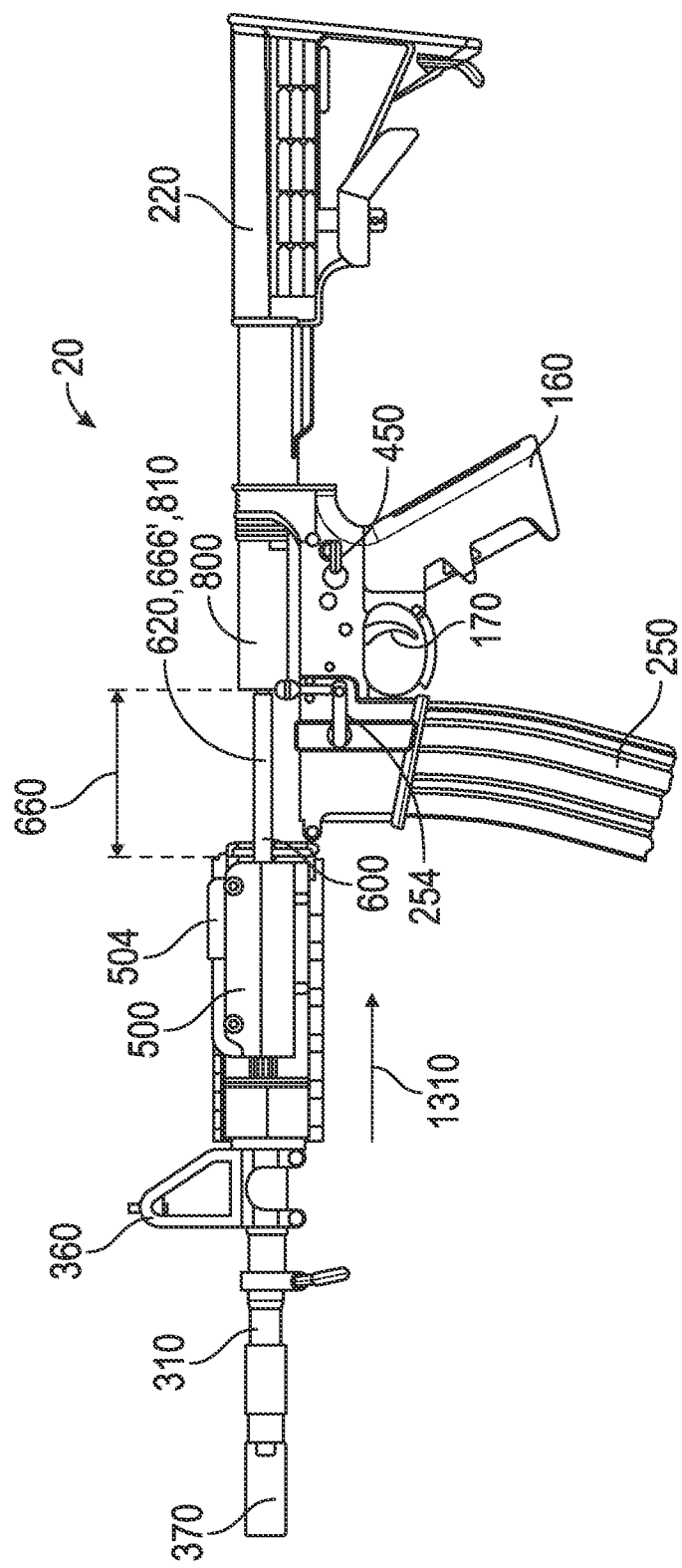
FIG. 12 is a sequencing side view showing the sliding mass of the linear motor extending the sliding shaft to the end of its rightmost movement relative to simulated firearm body in a simulation recoil cycle.
Figure 15:
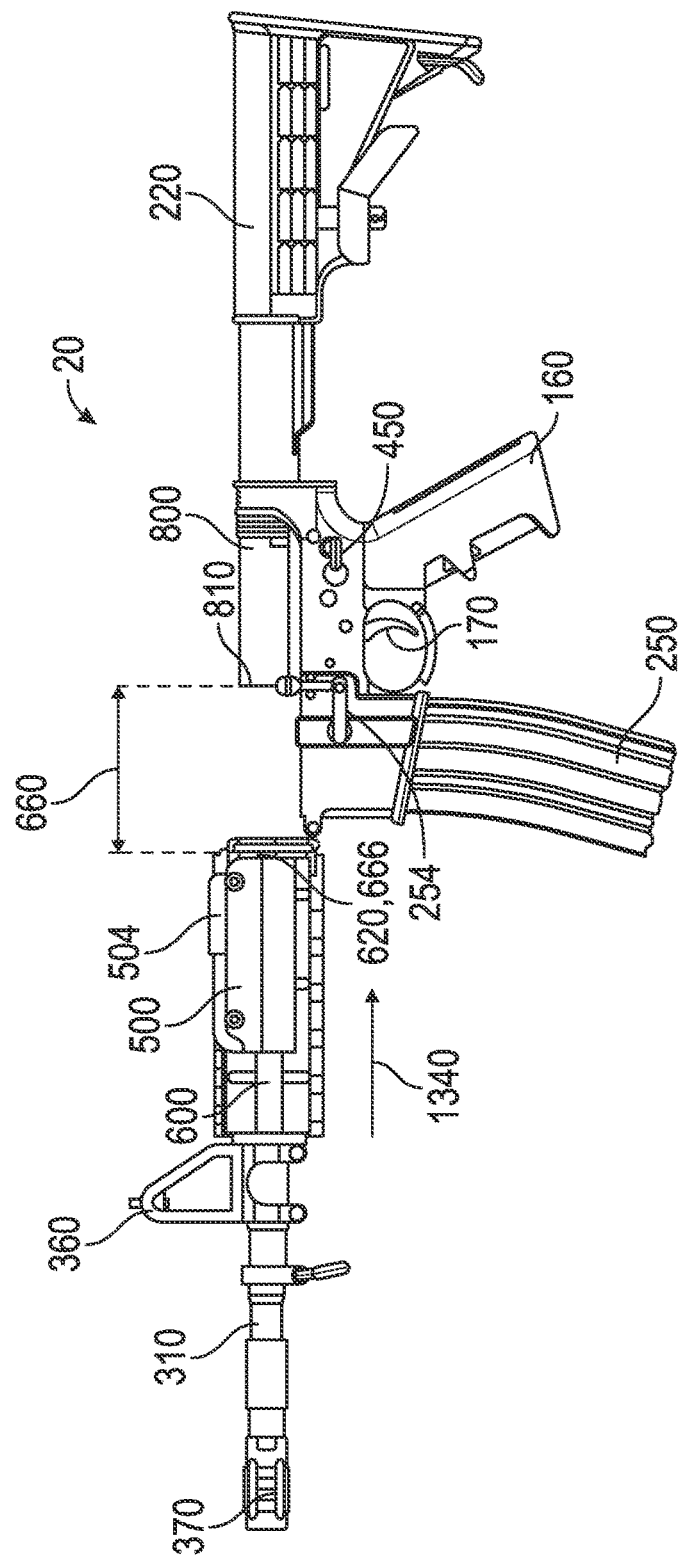
FIG. 15 is a sequencing side view showing the linear motor after finishing the retraction of the sliding mass relative to simulated firearm body in a simulation recoil cycle so that the linear motor is ready for the next simulation recoil cycle.
Figure 16:
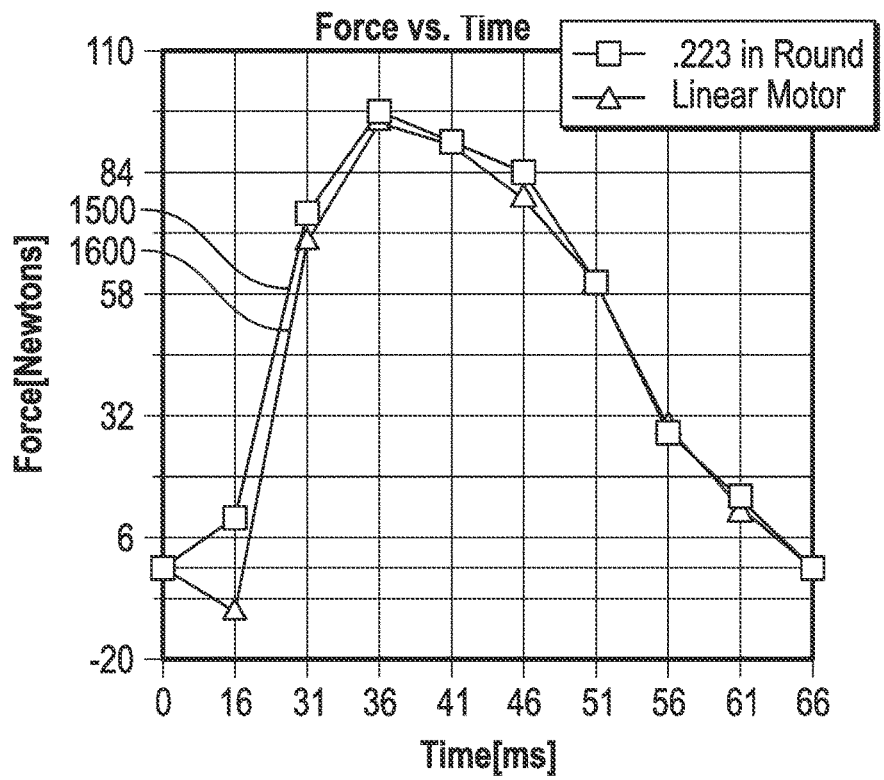
FIG. 16 is a prophetic graph plotting recoil force versus time of a first round of ammunition along with force versus time caused by the linear motor kinematically controlling dynamics of the sliding mass.

FIG. 16 is a graph plotting hypothetical recoil force versus time (shown in green with the square tick marts) of a first round of ammunition along with force versus time caused by the linear motor kinematically controlling dynamics of the sliding mass (shown in brown with the triangular tick marks). FIG. 16 can be compared to sequencing FIGS. 11-15. At time zero second end 620 of sliding mass 600 is as shown in FIG. 11 at position 666, and has just started to accelerate in the opposite direction of arrow 1300 (causing a reactive force in the direction of arrow 1300 to be imposed on simulated firearm body 20 and user holding body 20). Linear motor 500 causes second end 620 of sliding mass 600 to accelerate and move in the opposite direction of arrow 1300 until second end 620 reaches position 666' (shown in FIG. 12) having contact with first end 810 of stop 800. Immediately preceding reaching 666' acceleration of sliding mass 600 causes a reactive force in the direction of arrow 1300 (shown at time 16 milliseconds in FIG. 16 and in a negative reactive force). However, immediate after impact between second end 620 and first end 810, such collision/contact causes an acceleration of sliding mass 600 in the opposite direction of arrow 1310 creating a reactive force in the direction 1310 (shown between times 16 and 36 milliseconds in FIG. 16 and being a positive reactive force). During this same time period of contact/collision between second end 620 and first end 810, linear motor 500 can independently accelerate sliding mass in the opposite direction of arrow 1310 (adding to the reactive force 1310 shown in FIG. 12 by force vectors). From times 36 to 66 milliseconds on the graph shown in FIG. 16, controller 50 can be programmed to cause linear motor 500 to control acceleration of sliding mass 500 to create the desired simulated recoil reactive forces.

Figure 13:
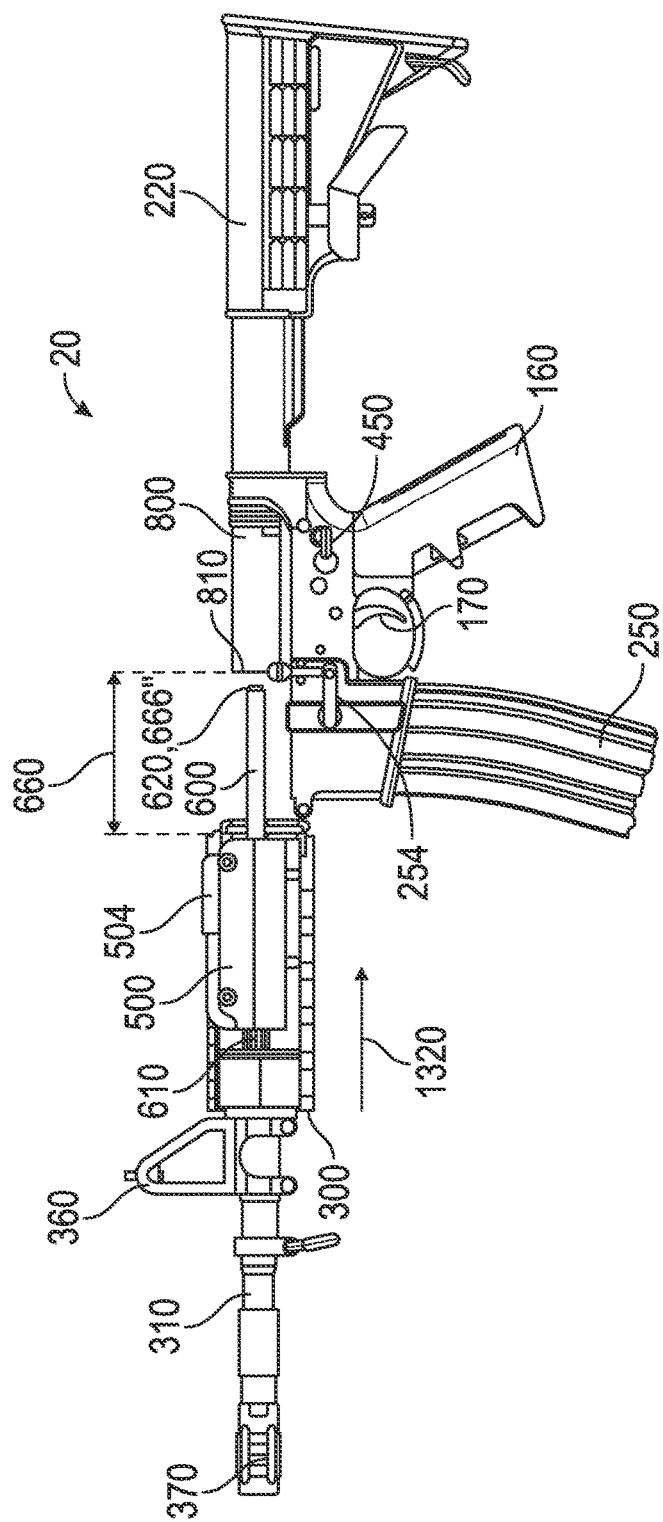
FIG. 13 is a sequencing side view showing the linear motor retracting the sliding mass relative to simulated firearm body in a simulation recoil cycle.
Figure 14:
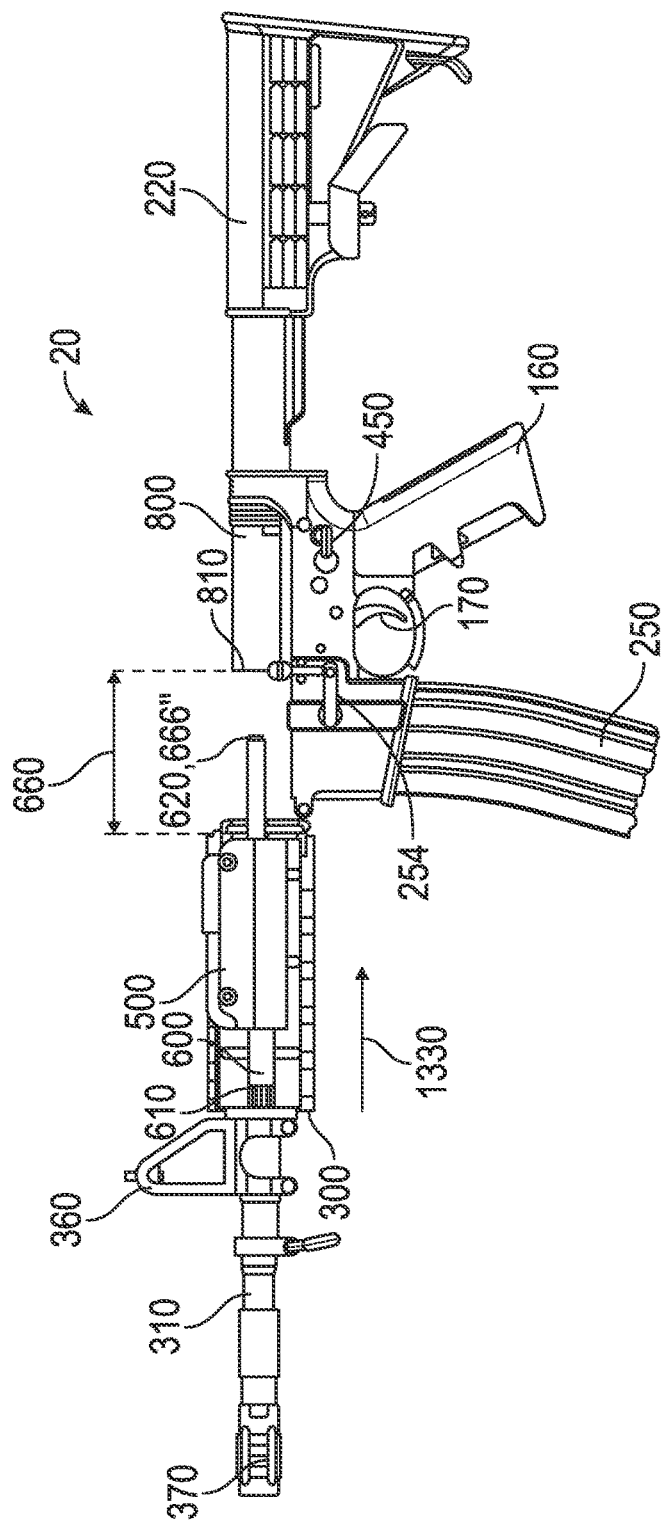
FIG. 14 is a sequencing side view showing the linear motor continuing to retract the sliding mass relative to simulated firearm body in a simulation recoil cycle.

FIG. 13 shows second end 620 at position 666'' where linear motor could cause sliding mass 600 to accelerate to create a reactive force shown at 41 milliseconds in FIG. 16. FIG. 14 shows second end 620 at position 666''' where linear motor could cause sliding mass 600 to accelerate to create a reactive force shown at 56 milliseconds in FIG. 16. FIG. 15 shows second end 620 at starting position 666 for the next recoil cycle. Now between possible 666''' shown in FIG. 14 to position 666 shown in FIG. 15 linear motor 500 will have to accelerate sliding mass in the direction of arrow 1330 (to eventually slow and then stop sliding mass 600 at position 666 to be ready for the next recoil cycle). However, such slowing acceleration can be controlled to a minimum to minimize the amount of negative reactive force imposed on simulated firearm body 20 and user 5. Such negative reactive force is not shown in FIG. 16 and can be relatively small. In such manner the amplitudes and timing of such amplitudes of recoil forces experienced by a user firing a particular type of bullet in a particular firearm can be simulated by programmed kinematics of sliding mass 600 being controlled by linear motor 500.

To simulate multiple firing cycles, the linear motor 500 can control dynamic movement of sliding mass 600 to create repeated force versus time patterns/diagrams of kinematic movement of sliding mass 600 the desired number of times or cycles.

Figure 17:
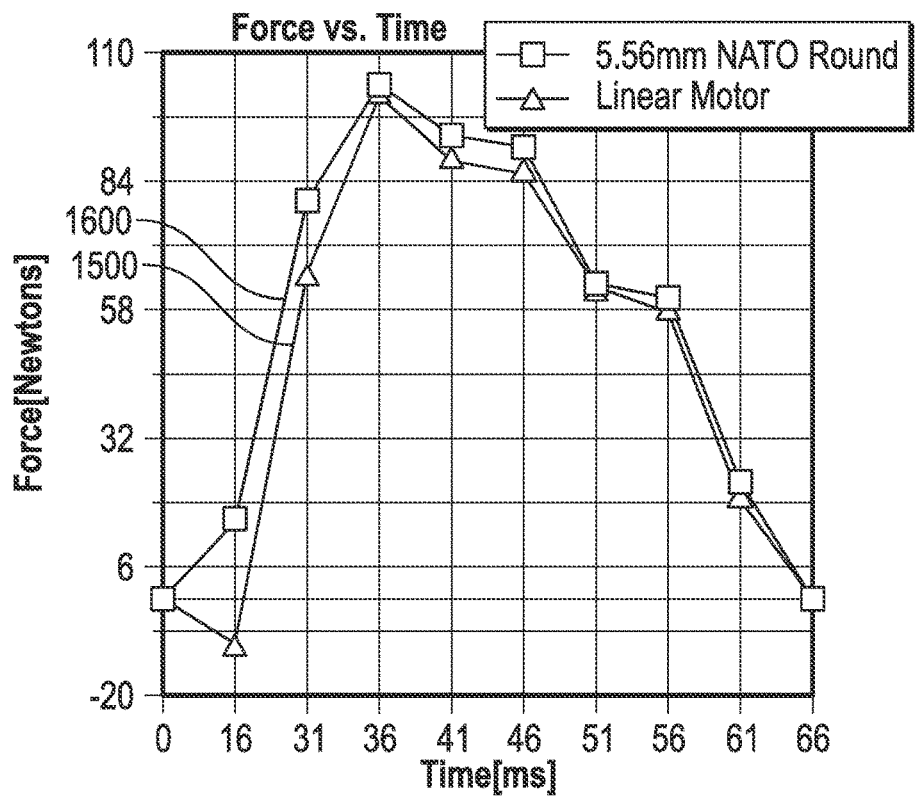
FIG. 17 is a prophetic graph plotting recoil force versus time of a second round of ammunition along with force versus time caused by the linear motor kinematically controlling dynamics of the sliding mass.

FIG. 17 is a graph plotting hypothetical recoil force versus time (shown in green with the square tick marts) of a first round of ammunition along with force versus time caused by the linear motor kinematically controlling dynamics of the sliding mass (shown in brown with the triangular tick marks). FIG. 17 shows a different bullet with different force versus time curve to be simulated by programmed linear motor 500 controlling kinematic movement of sliding mass 600. Additionally, the overall period of the curve can be different from 66 millisecond and can change depending of the recoil characteristics of the firearm being simulated firing a particular bullet.

The ability of linear motor 500 to create reactive forces with sliding mass 600 is further enhanced by the alternating of the mass of sliding mass 600. In one embodiment the different overall lengths for sliding mass 600 can be used (with the longer length option having a greater mass). With a greater mass for a given acceleration of such mass the reactive force created is found by the formula force equals mass times acceleration. In various embodiments sliding mass 600 can be 270 mm in length slider, or can be 350 mm in length, and such optional sliding masses 600,600' can be interchanged with linear motor 500 to modify:

1) The mass of the sliding mass 600. The 270 mm sliding mass 600 has a mass of 215 grams and the 350 mm sliding mass 600' has a mass of 280 grams. The change in mass gives rise to different reactive forces caused by acceleration, and different free recoil energies, which can be used to better approximate the force vs. time curve produced by certain rounds of ammunition.

2) Additionally, the length of sliding mass 600 changes the overall acceleration and length of travel 660 linear motor 500 has to approximate the force vs. time curve produced by particular rounds of ammunition.

With a shorter sliding mass 600, linear motor 500 can achieve higher velocities due to the longer acceleration time and thus give larger values of free recoil energy to the user.

The maximum reactive forces for different sliding masses 600,600' can be computed as follows:

$$E_{tgu}=0.5*m_{gu}*v_{gu}^2$$

since there will be no powder or velocity of the powder charge, these values ($v_c$ & $m_c$) go to zero and we have the standard kinetic energy formula $K=(0.5*m*v^2)$. The maximum values achieved for $E_{tgu}$ are as follows for both sliders:

| Sliding Mass Length | Sliding Mass Mass | Sliding Mass Acceleration | Overall Mass of Firearm | Free Recoil |
|---|---|---|---|---|
| 270 mm | 215 grams | 7.35 m/s² | 1.5 kg | 2.5 39 J |
| 350 mm | 280 grams | 7.4 m/s² | 1.5 kg | 4.0 71 J |

FIGS. 18-21 are schematic sequencing diagrams illustrating an individual 5 repetitively firing of a firearm simulating body 20 with recoil causing increasing loss of accuracy with repetitive shots. In these figures is schematically shown a simulating training exercise via semi-auto-burst fire modes with electronic recoil to training an individual 5 for accuracy.

One embodiment uses firearm simulating body 20 with linear motor 500 simulating an M4A1 rifle firing a particular type of bullet (although other types of firearms and bullets are envisioned in different embodiments). In one embodiment selector switch can have three modes of operation (1) semiautomatic 454, (2) burst 456, and (3) fully automatic 458. Schematically show in FIGS. 18-21 is a user fire after selecting burst 452 mode. In burst mode (2) a series of three simulated bullet firings will be performed by system 10.

Figure 18:
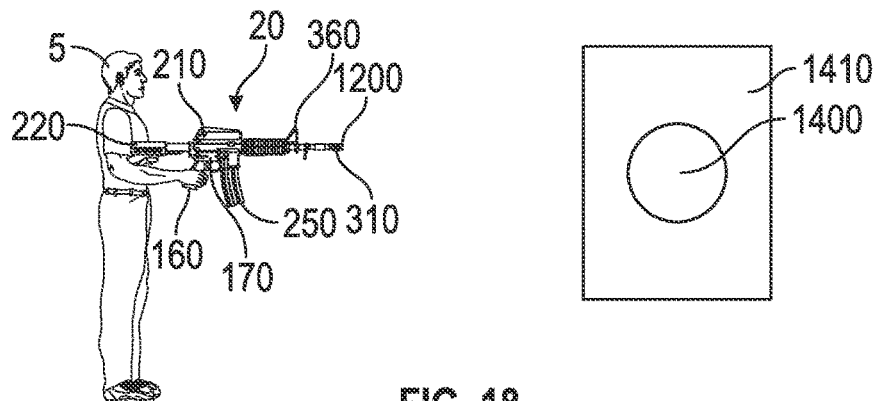
FIGS. 18-21 are schematic sequencing diagrams illustrating an individual repetitively firing of a firearm with recoil causing increasing loss of accuracy with repetitive shots.

Individual 5 selects which type of simulation for this particular firearm is desired by using selector switch 450. As schematically shown in FIG. 18, user 5 aims simulated firearm body 20 at target area 1400. User next pulls on trigger 170 which is connected to trigger switch 172 sending a signal to controller 50. Controller 50 controls linear motor 500 which in turn controls sliding mass 600. Controller 50 also controls laser emitter 1200.

Controller 50 causes linear motor 500 causing sliding mass 600 to traverse a preprogrammed kinematic movements creating reactionary forces in accordance with a predefined reactionary force versus time in an effort to simulate the recoil forces that an individual would experience actually simulating the particular bullet for the particular gun. Controller 50 is also connected to an infrared laser system 1200 which can be in phase with user 5 pulling trigger 170. Laser 1200 simulates on the target screen (area 1400 or 1410) where a bullet would have traveled from simulated firearm body 20.

Figure 19:
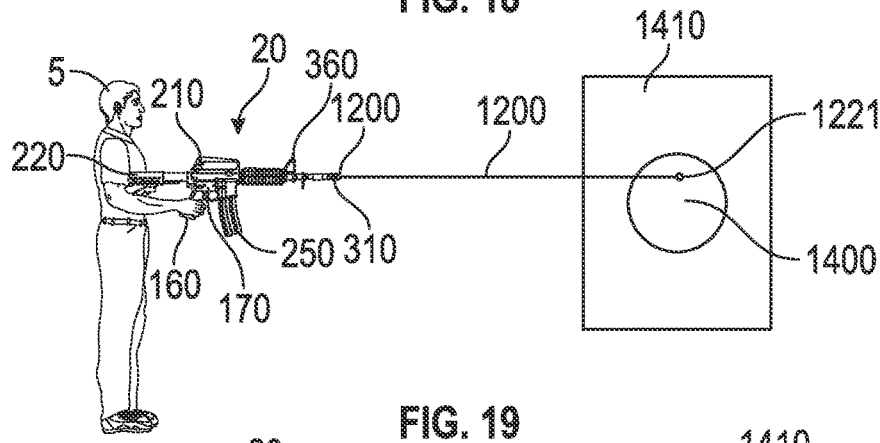
Figure 20:
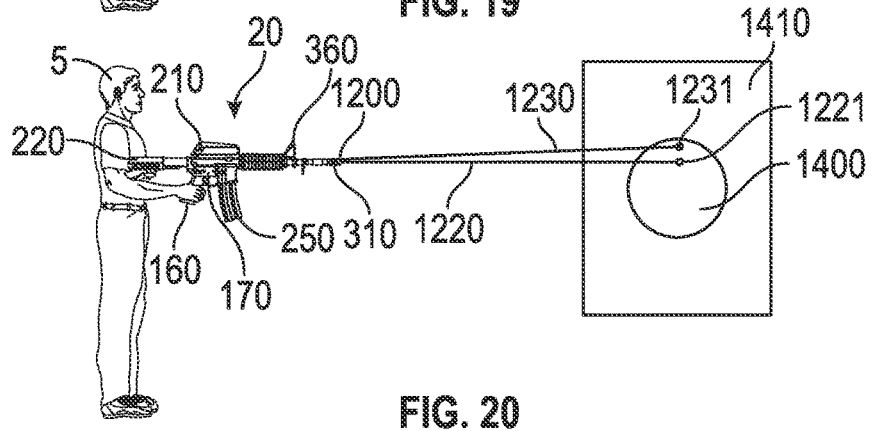
Figure 21:
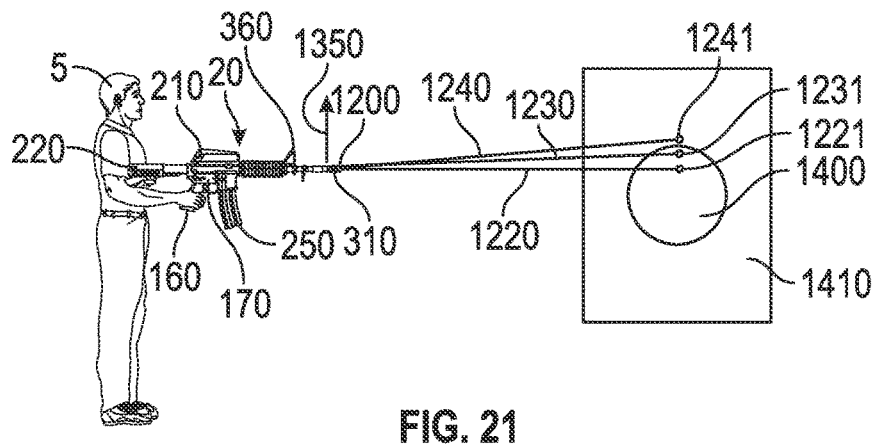

In FIG. 19, the first of the three simulated burst rounds, laser 1200 shoots laser line 1220 and has a hit 1221 in target area 1400. In FIG. 20, the second of the three simulated burst rounds, laser 1200 shoots laser line 1230 and has a hit 1231 in target area 1400 (but closer to non-target area 1410). In FIG. 21, the second of the three simulated burst rounds, laser 1200 shoots laser line 1230 and has a hit 1231 in non-target area 1410. Arrow 1350 schematically represents the simulated recoil placed on body 20 causing user's 5 aim to degrade. With repeated use of system 10, user 5 can become accustomed to the simulated recoil and adjust his aim.

In an actual training exercise, the projection system will simulate "target space" and "non-target" space for user 5. If user 5 fires off of the screen 1400, this counts as "non-target" space 1410. These targets 1400 can be either moving or stationary and may vary greatly in size and shape. However, the projection system will count the total number of bullet strikes (e.g., 1221,1231) in target space and non-target space and add them. This enables the following formula to be used:

Accuracy=[[Total−(non-target space)]/Total]*100% to determine accuracy for user 5.

For example, if the user fired a total of 10 shots, corresponding to 4 shots in the target space 1400 and 6 shots in the non-target space 1410 the formula would read:

Accuracy=[[10−6]/10]*100%.

This simulation would give the user an accuracy of 40%. Since a real recoil effect will be produced and knock the user's sights off of the target space 1400 for which he is aiming, system 10 this will help to train user 5 to become more accurate in firing actual firearm system but without the need to fire live ammunition.

Located inside barrel 310 can be laser emitter 1200. A preferred laser emitter assembly is available Laser Shot, located in Stafford, Tex. Laser emitter 1200 assembly includes a circuit board, a battery box, a switch, and a laser emitter. Laser emitter 1200 is preferably housed within barrel 310, and is oriented to emit a laser beam substantially parallel to and coaxial with the longitudinal centerline of barrel 310.

A typical cyclic rate for full automatic fire with a low cyclic rate is approximately 600 rounds per minute. A typical cyclic rate for full automatic fire at a high cyclic rate is approximately 900 rounds per minute, approximately simulating the cyclic rate of an M-4A1, AR-15, and/or M-16 rifle.

The firearms training simulator therefore simulates the recoil, cyclic rate, configuration, controls, and mode of operation of the firearm for which it is intended to be used to train a shooter. The training simulator therefore provides the opportunity to conduct decision-making training scenarios projected on a screen, with the safety and reduced facilities cost of using a laser instead of live ammunition, while duplicating a sufficient number of the characteristics of a conventional firearm so that the training will effectively carry over to a conventional firearm.

Figure 22:
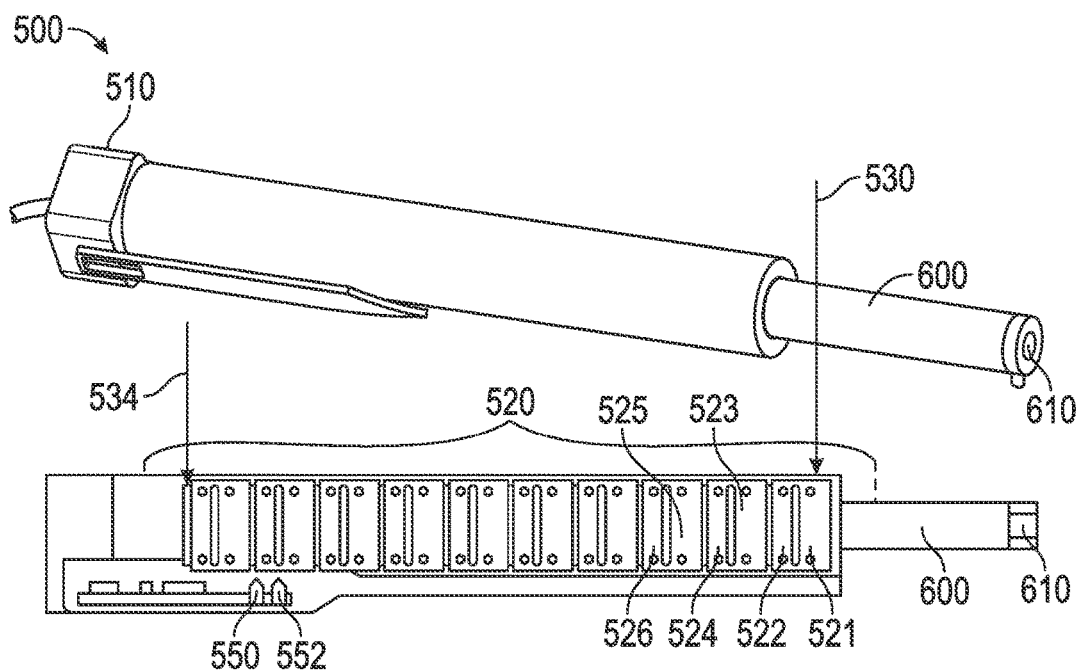
FIG. 22 is a perspective view of another embodiment of a linear motor and sliding mass.
Figure 23:
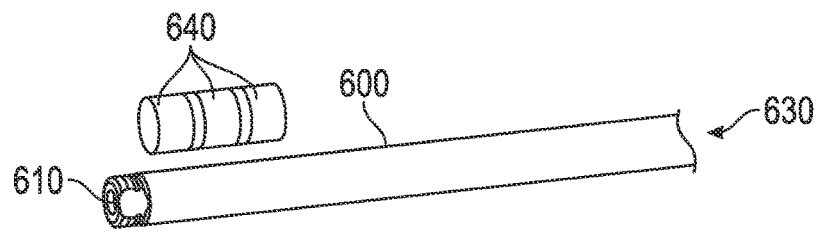
FIG. 23 is a perspective view of a sliding mass with exemplary magnets removed.
Figure 24:
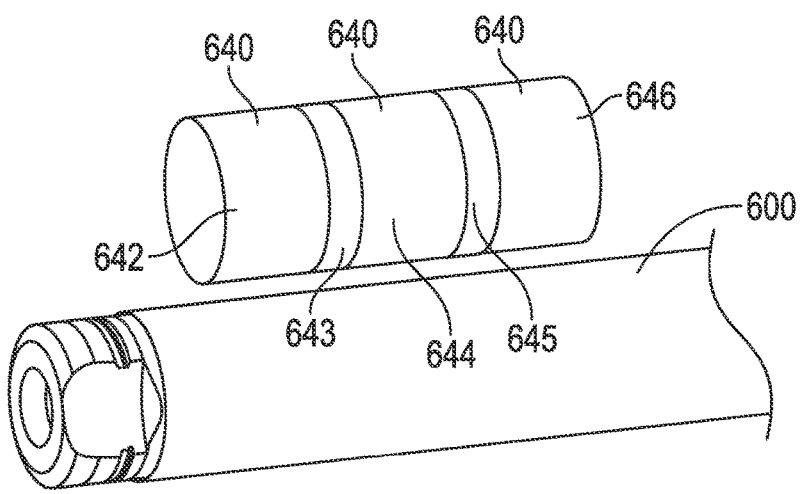
FIG. 24 is an enlarged perspective view of the sliding mass with exemplary magnets.

FIG. 22 is a perspective view of another embodiment of a linear motor 500 and sliding mass 600. Linear motor 500 can include sensors 550 and 552, which can be Hall Effect sensors. FIG. 23 is a perspective view of a sliding mass 600 with exemplary plurality of magnets 640 removed. FIG. 24 is an enlarged perspective view of the sliding mass 600 with exemplary magnets 640. In FIGS. 23 and 24 the plurality of magnets 640 (e.g., magnets 642, 644, 646, etc.) can be comprised of neodymium. Additionally, between pairs of magnets 640 can be spacers (e.g., spacer 643 between magnets 642 and 644, and spacer 645 between magnets 644 and 645). In a preferred embodiment the spacers can be comprised of iron (such as ferromagnetic iron). In a preferred embodiment plurality of magnets 640 are aligned so that like poles are facing like poles (i.e., north pole to north pole and south pole to south pole). In FIGS. 23 and 24, starting from the left hand side, magnet's 642 pole to the left is north and pole to the right is south, and magnet's 644 pole to the left is south and pole to the right is north. Thus, the plurality of magnets 640 contained in slider/driven mass 600 have similar poles facing each other creating a repelling force. In a preferred embodiment the outer shell of sliding mass 600 longitudinally holds the plurality of magnets 640 and spacers securely together. In preferred embodiment the outer shell can be stainless steel which can be non-magnetic of a material that does not substantially interfere with the magnetic forces between plurality of coils 520 of linear motor 500 and plurality of magnets 640 of sliding mass 600.

Figure 25:
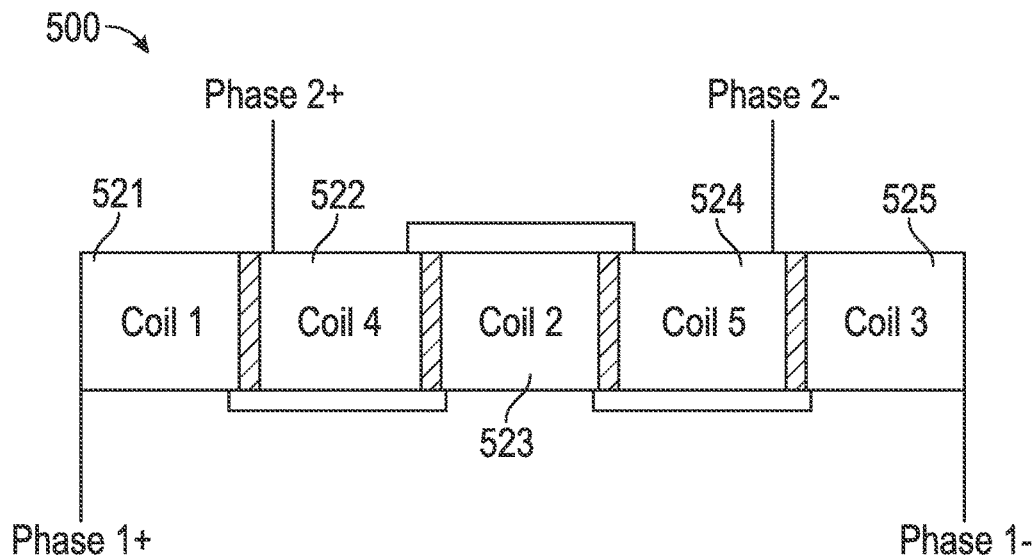
FIG. 25 is a schematic diagram illustrating operation of the coils in a linear motor.
Figure 26:
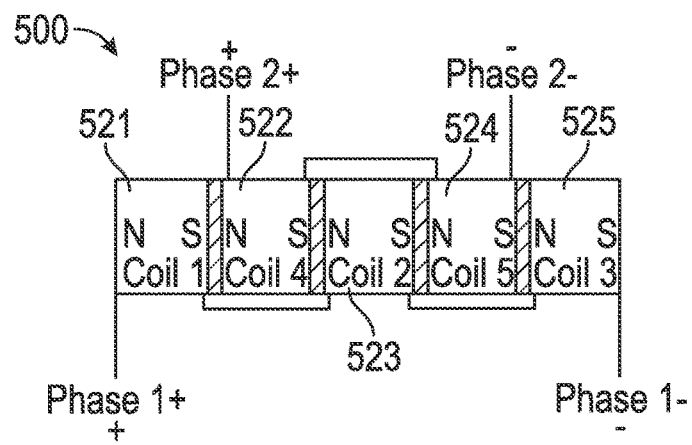
FIGS. 26 and 27 are schematic diagrams illustrating operation of the coils in a linear motor in two different energized states.
Figure 27:
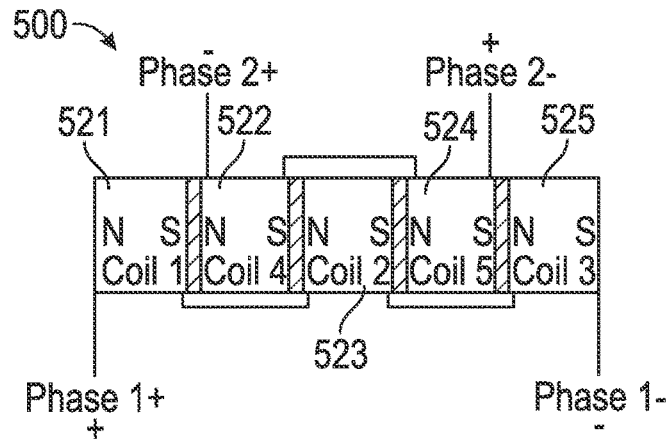

FIGS. 25-29 schematically show operation of linear motor 500 and sliding mass 600 as the plurality of magnets 640 are driven by the plurality of coils 520. FIG. 25 is a schematic diagram illustrating operation of the plurality of coils 520 in a linear motor 500. FIGS. 26 and 27 are schematic diagrams illustrating operation of the coils 520 in a linear motor 500 in two different energized states.

In FIG. 25, coils 521, 523, and 525 in the stator of linear motor 500 can be wired in series and labeled as phase 1 (when wired together in series these coils of phase 1 can be considered sub-coils of a single independently controllable magnetic coil). Coils 522 and 524 are also wired in series and are labeled as phase 2 (when wired together in series these coils of phase 2 can be considered sub-coils of a single independently controllable magnetic coil). The plurality independently controllable magnetic coils 520 of linear motor 500 can be wound in the same or different direction depending on design. Each independently controllable coil in phase 1 and 2 produces its own magnetic field when energized. This allows for independently controllable magnetic coils of phase 1 and 2 the plurality of coils 520 to repel each other or for phase 1 and phase 2 coils to attract each other depending on the way the phases are polarized and the coils wound. These alternative states of polarization are shown in FIGS. 26 and 27. In FIG. 26 phase 1 and phase 2 are polarized in the same direction so that coils in the two phases are attracted to each other. In FIG. 27 phase 1 and phase 2 are polarized in the opposite direction so that coils in the two phases repel to each other. It can be seen that by varying the polarization of phases in the plurality of independently controllable magnetic coils 520 of linear motor 500, sliding mass 600 can be controllably moved as desired through the plurality of coils 520 so as to create the desired reactive forces user 5 such as time dependently controlled force, acceleration, velocity, position, and/or momentum; or overall impulse.

Figure 28:
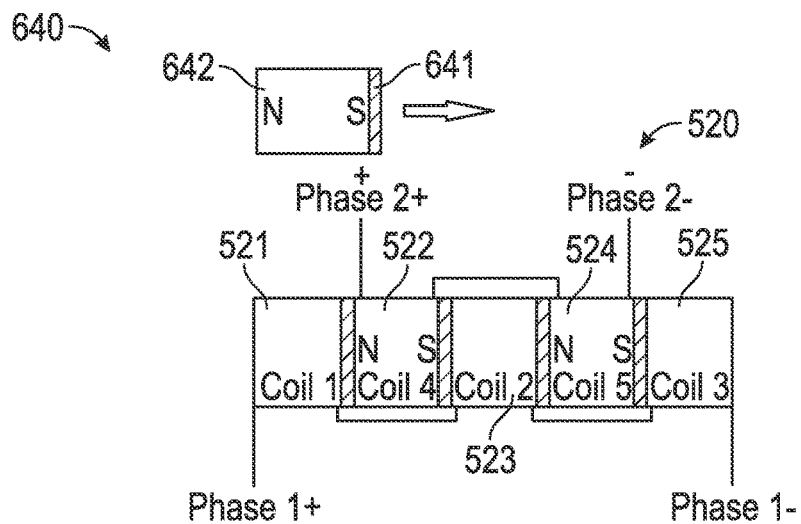
FIGS. 28 and 29 are schematic diagrams illustrating movement of magnets through a linear motor in two different energized states.
Figure 29:
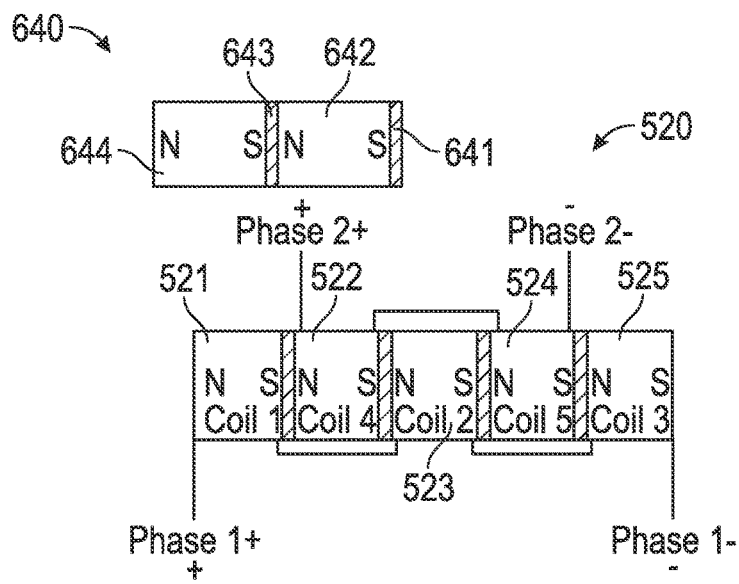

FIGS. 28 and 29 are schematic diagrams illustrating movement of the plurality of magnets 640 of sliding mass 600 through the plurality of coils 520 a linear motor 520 in different energized states.

FIG. 28 schematically indicates initial movement of sliding mass 600 with plurality magnets 640 through plurality of coils 520 of linear motor 500. In FIG. 28, the first magnet 642 of sliding mass 600 enters plurality of coils 520 of linear motor 500. Plurality of coils 520 can then be energized with phase 2 polarized as shown and phase 1 not being energized (or OFF). This causes magnet 642 (and sliding mass 600) to be pulled deeper into plurality of coils (schematically indicating by the arrow towards the right). As schematically shown in FIG. 29, when first magnet 642 moves halfway into coil 522, phase 1 can be energized (or turned ON) creating a pulling force on magnet 642 and speeds the second magnet 644 to the center of coil 521 while at the same time repelling the magnet 642. The movement of sliding mass 600 eventually stops when the plurality of magnets 640 reach steady state with the plurality of coils 520, which in this case means that the north pole of coils 521 and 522 are respectively aligned with the north poles of magnets 642 and 644; and coil 522 is aligned with magnet 644's south pole and coil 521 is aligned with the magnet 644's south pole. Thus, the magnetic forces are in equilibrium and movement ceases while phase 1 and 2 remain energized with this polarization. So, by switching the coils ON/OFF and by alternating the coils polarization the slider (filled with neodymium magnets) can be pushed or pulled through the stator (made up of many coils). Furthermore, the number of coils depicted in FIGS. 25 through 29 through can be increased to have a larger accelerating cross section.

Figure 30:
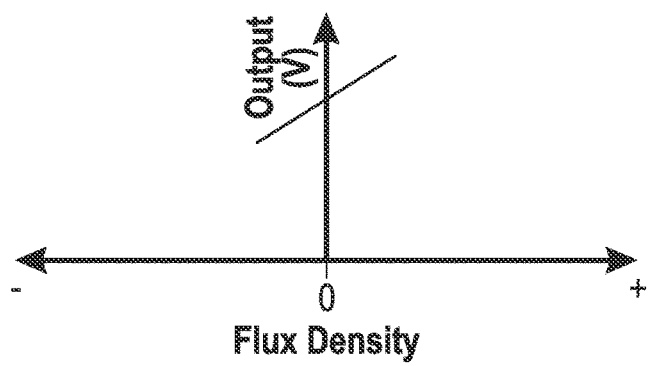
FIG. 30 is a diagram illustrating magnetic flux density versus voltage output.

The velocity, acceleration, and linear distance of sliding mass 600 can measured as a function of Hall Effect sensors 550 and 552 that are 90 degrees out of phase. Out of phase Hall Effect sensors 550 and 552 can each produce a linear voltage in response to increasing or decreasing magnetic field increases. FIG. 22 can show the mechanical alignment in linear motor 5000 and sensors 550,552. The response that sensors 550 and 552 give as a function of magnetic field strength (flux through the sensor) versus voltage (out of the sensor) is depicted in FIG. 30, which is a diagram illustrating magnetic flux density versus voltage output.

Figure 31:
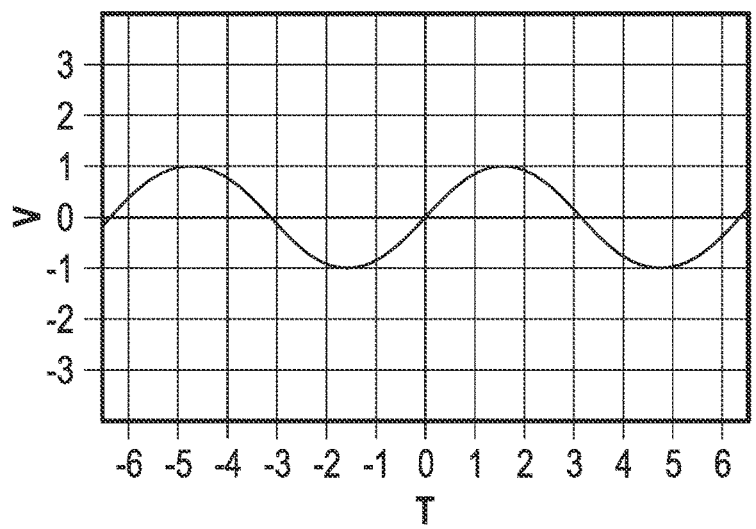
FIGS. 31 and 32 are exemplar diagrams of sensor voltage response versus time for a slider moving through the linear motor.
Figure 32:
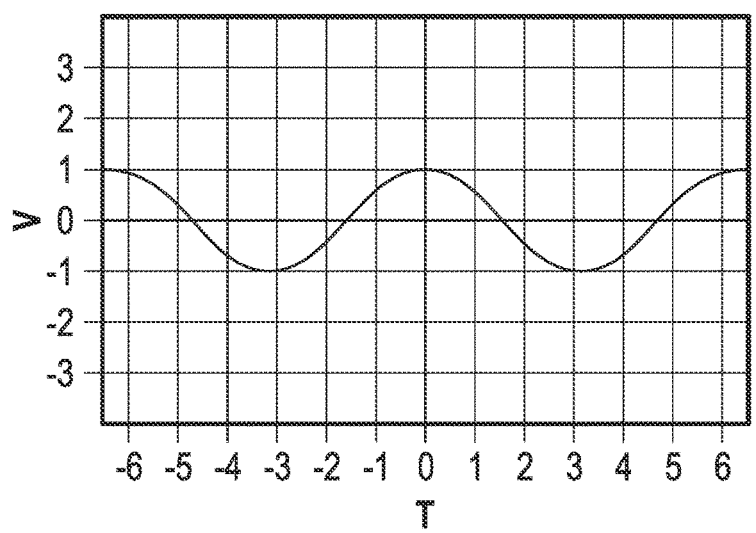

FIGS. 31 and 32 are exemplar diagrams of sensor 550 and 552 voltage response versus time for a slider moving through the linear motor. When sliding mass 600 is moved through the plurality of coils 520 of linear motor 500, 90 degree out of phase sensors 550 and 552 provide a voltage response versus time falling into a Sine or Cosine function as indicated in FIG. 31 (sine(x) for sensor 550) and FIG. 32 (cosine(x) for sensor 552). These resultant waves are generated by sensors 550 and 552 because generated magnetic flux for the plurality of magnets 640 inside sliding mass 500 are most powerful at their magnetic poles. So as the north poles of two magnets approach, the wave goes positive and peaks when directly above those poles. Continuing in the same direction, as the south poles approach, the wave goes negative and peaks when directly above those poles. Thus, one sensor 550 gives a function of Sin(x) and the other sensor 552 gives a function of Cos(x). As can be seen these functions are 90 degrees out of phase. Two sensors 550 and 552 are used for better precision feedback and control of sliding mass 600 through the plurality of coils 520 of linear motor 500, and as a method to make sure sliding mass is continually tracked accurately.

Figure 33:
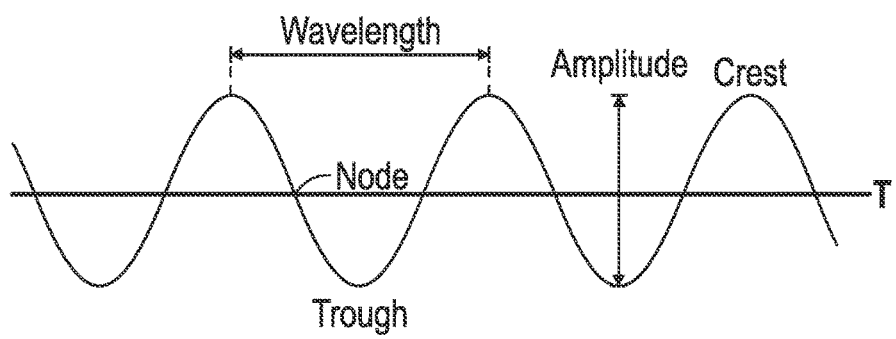
FIG. 33 is a diagram of a sample wave form.

To provide additional explanation, sensor 550 generating a sin wave is plotted in FIG. 31, and will be further examined regarding how this graph can be used to track velocity, acceleration, and displacement of sliding mass 600. FIG. 33 is a diagram of a sample wave form which illustrates the various components of a wave form generated by sensor 550. The wavelength (λ) relates to the velocity of sliding mass 600 through plurality of coils 520 of linear motor 500. As the wavelength shortens, the frequency can be calculated by f=1/λ, and the frequency will increase as the wavelength shortens.

Figure 34:
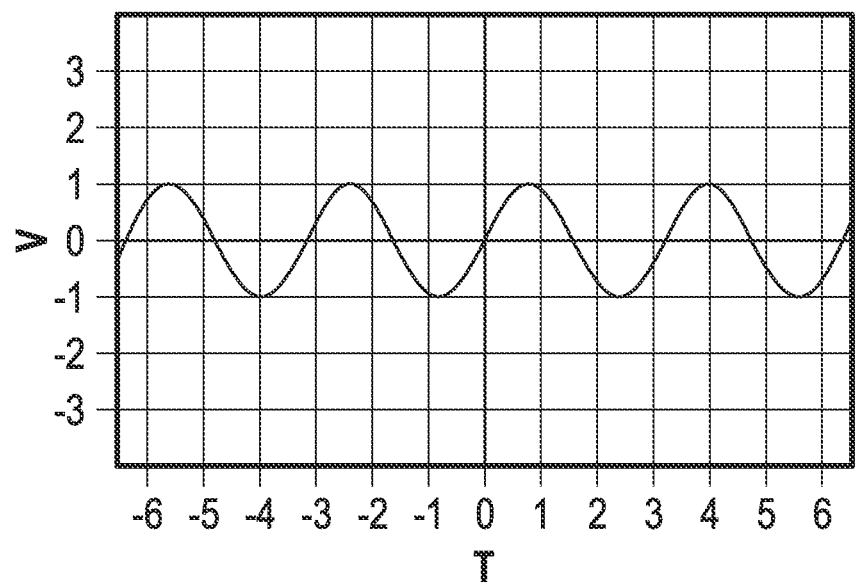
FIGS. 34 and 35 are exemplar diagrams of sensor voltage response versus time for a slider moving through the linear motor at two different constant linear speeds.
Figure 35:
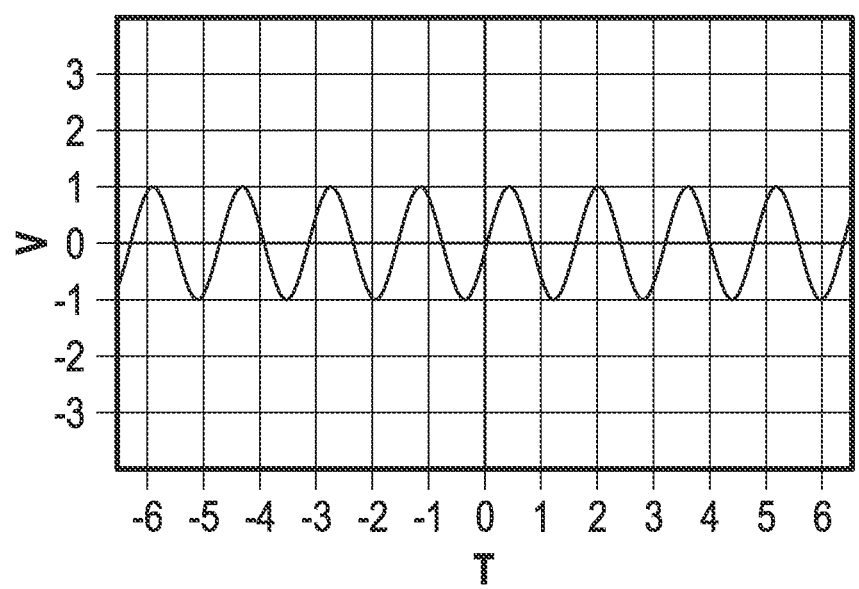

FIGS. 34 and 35 are exemplar diagrams of sensor voltage response versus time for a sliding mass 600 moving through the linear motor 500 at two different constant linear speeds. For example, in FIG. 34 sliding mass 600 can be said to be moving through plurality of coils 520 at 1 meter per second and generating this wave. As sliding mass 600 speeds up to 2 meters per second, FIG. 35 is generated. It can be seen that this increase in wave frequency corresponds to the velocity with which sliding mass 600 is moving through the plurality of coils 520 of linear motor 500. Furthermore, the change in waveform from FIG. 34 to FIG. 35 relates to the acceleration of sliding mass 600. FIGS. 34 and 35 each individually represent constant velocities of sliding mass 600 (although the constant velocity in FIG. 35 is twice that of the constant velocity in FIG. 34) so that in each of these two figures, there is no acceleration; however, as sliding mass 600 slider approached 2 meters per second linear speed shown in FIG. 35, the frequency increased to the value in FIG. 35: that frequency change over time can be used to compute acceleration of driven mass 600. Lastly, distance traveled by driven mass 600 can be calculated by knowing the length of the plurality of magnets 640 in sliding mass, and counting the number of wavelengths that go past sensor 550. Each wavelength corresponds to the full length of the permanent magnet inside the body of sliding mass 600. Accordingly, velocity, acceleration, and distance can be calculated from sensors 550,552 voltage versus magnetic flux graphs.

Emulating Overall Recoil Impulse

In one embodiment linear motor 500 and sliding mass 600 can be used to emulate total recoil impulse for a particular firearm firing a particular form of ammunition.

"Actual recoil force" is the force generated by a particular type of firearm firing a particular type of ammunition at any point in time after firing where such force is transmitting to the user. Such actual recoil force can be plotted over a particular period of time from initial firing of the ammunition in the firearm to the end of any actual recoil force following such firing.

On the other hand, "generated recoil force" is the reactive force generated by linear motor 500 controlling movement of sliding mass 600. Such generated recoil force will be transmitted to a user 5 holding simulated firearm body 20 of simulator system 10.

Actual recoil impulse is the area under a force versus time diagram where the force is generated by a particular type of firearm firing a particular type of ammunition. Generated recoil impulse is the area under a force versus time diagram 1600 of a reactive force generated by linear motor 500 controlling movement of sliding mass 600 (e.g., acceleration, velocity, and distance) over time.

FIG. 16 shows prophetic examples of diagrams for actual recoil force 1500 versus time, along with generated recoil force 1600 versus time. The area under the actual recoil force versus time diagram 1500 is the actual recoil impulse. The area under the generated recoil force versus time diagram 1600 is the generated recoil impulse. Note how the area under the generated recoil impulse can be both positive (above the zero), and negative (below the zero). In a preferred embodiment the negative area would be subtracted from the positive area in calculating total impulse. In other embodiments the negative area can be ignored in calculating total impulse.

In these two diagrams the force versus time diagrams 1500,1600 of actual recoil over time versus reaction forces generated by linear motor 500 and sliding mass 600 over time closely track each other so that the impulse and reactive impulse are approximately equal. However, in different embodiments the actual recoil over time diagram 1500 versus reaction forces generated by linear motor 500 and sliding mass over time 1600 can substantially vary as long as both calculated impulses (from the areas under the diagrams) are close to each other at the end of the firing cycle.

Figure 36:
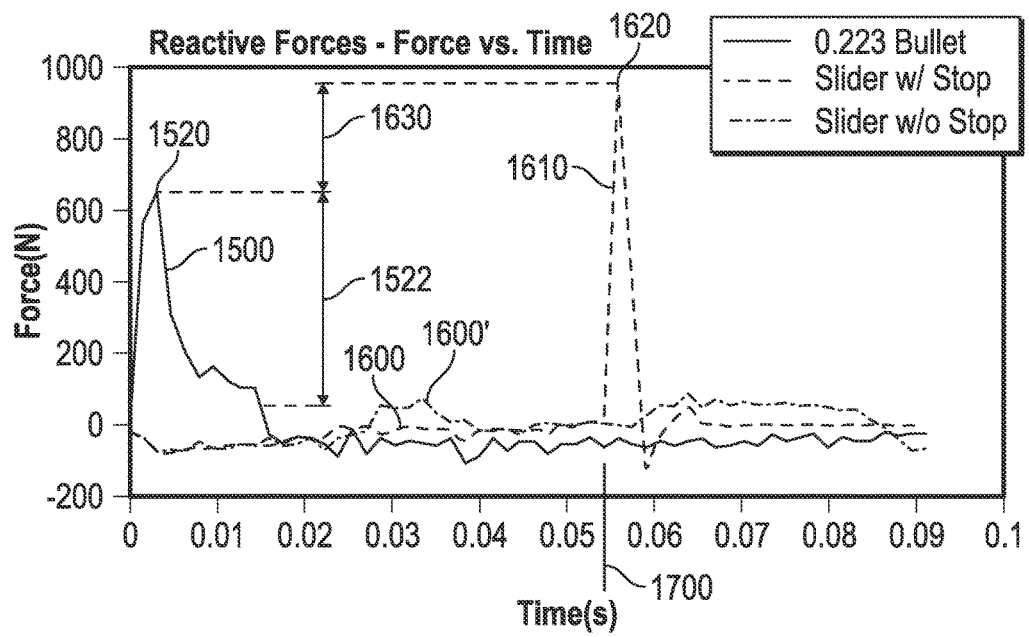
FIG. 36 is an exemplar diagrams of a force versus time plotted for recoil forces for an actual firearm, compared to simulated recoil forces by the method and apparatus using a mechanical stop, and not using a mechanical stop.

FIG. 36 shows a single diagram with three force versus time plots: (1) force versus time of actual forces 1500 (first plot for an M16/AR-15 type rifle firing a 0.223 Remington bullet/round having an overall weight of about 7.5 pounds (3.4 kg)), and (2) force versus time of generated reactive forces from linear motor and sliding mass in combination with a mechanical stop 1600, and (3) force versus time of generated reactive forces from linear motor and sliding mass without using a mechanical stop 1600'. A positive value of force indicates that a force pushing user 5 backward. As can be seen by the time, a firing cycle of about 90 milliseconds is used.

Diagram 1600 includes a spike 1610 when the slider 600 hits the mechanical stop 800, and the areas under each plot 1500,1600 should be roughly the same to get the same overall impulse. For diagram 1600, time 1700 indicates the initial contact between sliding mass 600 and mechanical stop 800. In different embodiments, because the time period for the collision between sliding mass 600 and mechanical stop 800 is so short (about less than 5 milliseconds), time of initial contact 1700 can also be calculated using the time of peak reactive force 1620.

In FIG. 36 is shown the peak 1520 of actual recoil force 1500 which is compared to the peak 1620 of generated recoil force 1600, and the difference 1630 between such peaks. In various embodiments mechanical stop 800 can be used to generate a spike 1610 in the generated recoil force which spike 1620 has a difference of 1630 compared to the peak 1520 of actual recoil force 1500.

In various embodiments peak 1620 can be such that the difference 1630 can be minimized. In various embodiments, during an emulated firing sequence, the difference 1630 is less than 50 percent of the peak 1620. In various other embodiments the difference 1630 is less than no more than 45, 40, 35, 30, 25, 20, 15, 10, 5, 4, 3, 2, and/or 1 percent of the peak 1620. In various embodiments the difference 1630 can be within range between any two of the above referenced percentages peak 1620.

In various embodiments, the average generated recoil force by linear motor 500 controlling slider 600 during a particular simulated firing sequence before initial contact of sliding mass 600 with mechanical stop 800 at time 1700 can be calculated by calculating the impulse up to initial impact at time 1700 divided by the time at time 1700. In various embodiments the peak 1620 of generated reactive force is at least 50 percent greater than the average generated recoil force by linear motor 500 controlling slider 600 during a particular simulated firing sequence before initial contact of sliding mass 600 with mechanical stop 800 at time 1700. In various embodiments the peak generated reactive force 1620 is greater than 55, 60, 65, 70, 75, 80, 85, 90, 95, 100, 110, 120, 130, 140, 150, 175, 200, 225, 250, 275, 300, 400, 500, 600, 700, 800, 900, 1000, 1200, 1500, and/or 2000 percent greater than the average generated recoil force by linear motor 500 controlling slider 600 during a particular simulated firing sequence before initial contact of sliding mass 600 with mechanical stop 800 at time 1700. In various embodiments a range between any two of the above referenced percentages can be used for such comparison.

In various embodiments, the average generated recoil force by linear motor 500 controlling slider 600 during an entire particular simulated firing sequence can be calculated by calculating the impulse during the entire firing sequence and dividing the time for such entire firing sequence. In various embodiments the peak 1620 of generated reactive force is at least 50 percent greater than the average generated recoil force by linear motor 500 controlling slider 600 during an entire particular simulated firing sequence (i.e., both before and after initial contact of sliding mass 600 with mechanical stop 800 at time 1700). In various embodiments the peak generated reactive force is greater than 55, 60, 65, 70, 75, 80, 85, 90, 95, 100, 110, 120, 130, 140, 150, 175, 200, 225, 250, 275, 300, 400, 500, 600, 700, 800, 900, 1000, 1200, 1500, and/or 2000 percent greater than the average generated recoil force by linear motor 500 controlling slider 600 during an entire particular simulated firing sequence. In various embodiments a range between any two of the above referenced percentages can be used for such comparison.

In various embodiments, the average generated recoil force by linear motor 500 controlling slider 600 during a particular simulated firing sequence after initial contact of sliding mass 600 with mechanical stop 800 at time 1700 can be calculated by calculating the impulse following initial impact at time 1700 divided by the time following time 1700. In various embodiments the peak 1620 of generated reactive force is at least 50 percent greater than the average generated recoil force by linear motor 500 controlling slider 600 during a particular simulated firing sequence subsequent initial contact of sliding mass 600 with mechanical stop 800 at time 1700. In various embodiments the peak generated reactive force is greater than 55, 60, 65, 70, 75, 80, 85, 90, 95, 100, 110, 120, 130, 140, 150, 175, 200, 225, 250, 275, 300, 400, 500, 600, 700, 800, 900, 1000, 1200, 1500, and/or 2000 percent greater than the average generated recoil force by linear motor 500 controlling slider 600 during a particular simulated firing sequence subsequent to initial contact of sliding mass 600 with mechanical stop 800 at time 1700. In various embodiments a range between any two of the above referenced percentages can be used for such comparison.

Figure 37:
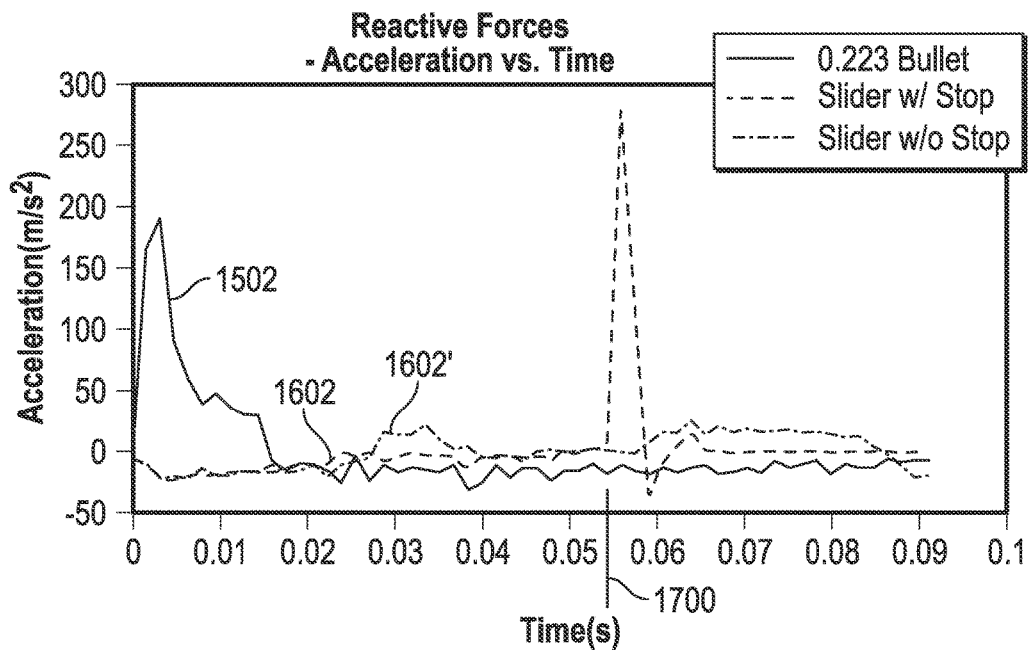
FIG. 37 is an exemplar diagrams of an acceleration versus time plotted for recoil acceleration for an actual firearm, compared to simulated acceleration of the sliding mass caused by the method and apparatus using a mechanical stop, and not using a mechanical stop.

FIG. 37 is an exemplar diagrams 1502,1602,1602' of an acceleration versus time plotted for recoil acceleration for an actual firearm 1502, compared to simulated acceleration of the sliding mass caused by the method and apparatus using a mechanical stop 1602, and not using a mechanical stop 1602'. Force from the acceleration diagrams can be calculated using the formula force equals mass times acceleration.

Figure 38:
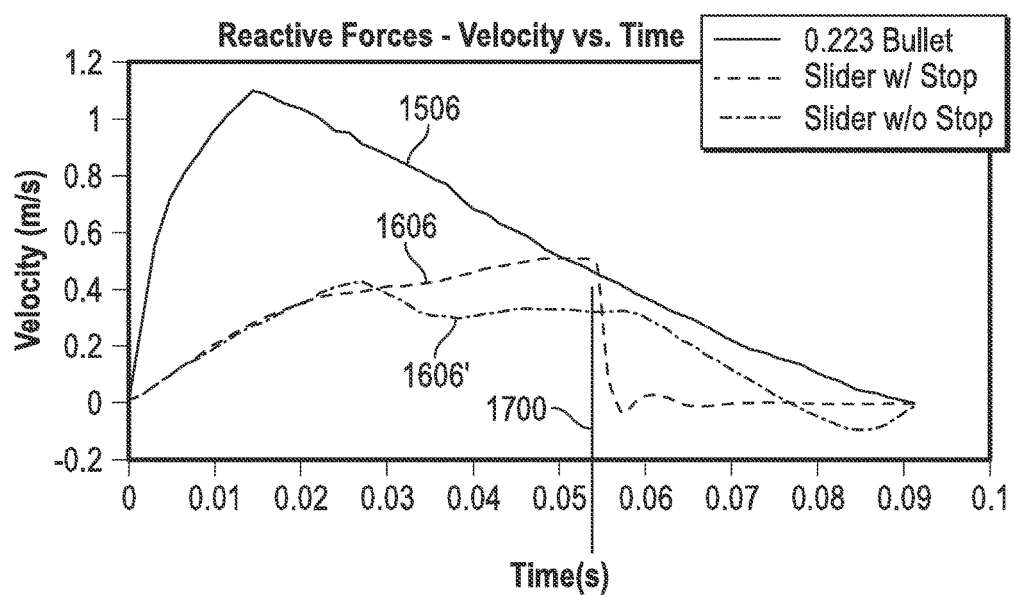
FIG. 38 is an exemplar diagrams of a velocity versus time plotted for recoil velocity for an actual firearm, compared to simulated velocity of the sliding mass caused by the method and apparatus using a mechanical stop, and not using a mechanical stop.

FIG. 38 is an exemplar diagrams 1504, 1604, 1604' of a velocity versus time plotted for recoil velocity for an actual firearm 1504, compared to simulated velocity of the sliding mass caused by the method and apparatus using a mechanical stop 1604, and not using a mechanical stop 1604'.

In one embodiment stop 800 can be employed to modify the generated recoil force diagram from linear motor 500 controlling sliding mass 600 by sharply increasing the reactive force at the point of collision between sliding mass 600 and mechanical stop 800. A mechanical stop 800 can be employed inside the simulated firearm body 20 to "rigidly" (i.e., more quickly negatively accelerate to zero sliding mass 600 than linear motor 500 is capable of) at the end of allowed length of travel 660. Such quick stop produces an enhanced recoil effect on user 5, and higher generated reactive force. In one embodiment, the reactive force generated by sliding mass 600 colliding with mechanical stop 800 is greater than any force generated by linear motor 500 accelerating sliding mass 600 during an emulated firing sequence.

In various embodiments, during an emulated firing sequence, the maximum reactive force generated by linear motor 500 accelerating sliding mass 600 is no more than 50 percent of the reactive force generated by sliding mass 600 colliding with mechanical stop 800. In various other embodiments the maximum reactive force generated by linear motor 500 accelerating sliding mass 600 is no more than 55, 60, 65, 70, 75, 80, 85, 90, 95, 99, and/or 100 percent of the reactive force generated by sliding mass 600 colliding with mechanical stop 800. In various embodiments the maximum reactive force generated by linear motor 500 accelerating sliding mass 600 can be within range between any two of the above referenced percentages of the maximum reactive force generated by linear motor 500 controlling sliding mass 600.

In various embodiments either actual recoil impulse and/or the generated recoil impulse by linear motor 500 controlling sliding mass 600 are within about 50, 55, 60, 65, 70, 75, 80, 85, 90, 95, and/or 100 percent of each other. In various embodiments a range between any two of the above referenced percentages can be used.

In various embodiments the total time for an emulated firing cycle by linear motor 500 controlling sliding mass 600 can be less than about 200 milliseconds. In various embodiments the maxim time for an emulated firing cycle can be less than about 25, 30, 35, 40, 45, 50, 55, 60, 65, 70, 75, 80, 85, 90, 95, 100, 110, 120, 130, 140, 150, 160, 170, 180, 190, and/or 200 milliseconds. In various embodiments the maximum time can be between any two of the above referenced times.

Emulating a Force Versus Time Plot of Firearm.

In one embodiment an actual firearm with actual ammunition can be tested and the actual recoil force over time plotted. In this embodiment linear motor 500 and magnetic mass/shaft 600 movement (e.g., acceleration, velocity, and position) can be programmed so as to emulate the actual force versus time diagram that was obtained from test. In different embodiments the emulated force versus time can be within 1, 2, 3, 4, 5, 10, 15, 20, 25, 30, 35, 40, 45, and/or 50 percent of the plot. In different embodiments the variation can be within a range between any two of the above referenced values. In different embodiments total impulse (which is the integral or sum of the area under the force versus time diagram) can be emulated for relatively short time sequences as it is believe that users have difficulty perceiving changes in force over time for very short time intervals regarding recoil forces, and effectively feel the overall impulse of the recoil force in firearms.

Changing the Strength of the Magnetic Field of Linear Motor

In one embodiment, the strength of the magnetic field generated by the plurality of coils 520 of linear motor 500 as a magnet in magnetic mass/shaft 600 passes by and/or is in touch with a particular coil generating a magnetic field can be increased from an initial value. In different embodiments the strength of the field can be changed by 1, 2, 3, 4, 5, 10, 15, 20, 25, 30, 35, 40, 45, and/or 50 percent of the initial value. In different embodiments the variation can be within a range between any two of the above referenced percentages.

Using Sensors To Directly/Indirectly Measure Dynamic Properties of Sliding Mass and Have Linear Motor Control Dynamic Properties of Sliding Mass Based on Sensor Input In one embodiment, the acceleration, velocity, and/or position versus time of the magnetic mass/shaft 600 can be measured directly and/or indirectly (such as by sensors 550 and/or 552), and linear motor 500 can change/set the strength of the magnetic field generated by plurality of coils 520 to achieve a predetermined value of acceleration, velocity, and/or position versus time for sliding mass 600. In different embodiments the predetermined values of emulated acceleration, velocity, and/or position versus time can be based on emulating a force versus time diagram obtained from testing an actual firearm (or emulating impulse). In different embodiments the emulated diagram can be within 1, 2, 3, 4, 5, 10, 15, 20, 25, 30, 35, 40, 45, and/or 50 percent of the plot. In different embodiments the variation can be within a range between any two of the above referenced values.

Options to Program in Different Variations for Firearm to be Simulated

In various embodiments, a user of system 10 is provided one or more of the following options in using system 10 regarding changes in a type of firearm for which recoil is to be simulated by system 10.

(a) different size/caliber/type of ammunition in actual type of firearm to be simulated with particular type of ammunition.

(b) adding/removing a muzzle suppressor to actual type of firearm to be simulated with particular type of ammunition.

(c) different size/type of bolt springs for actual type of firearm to be simulated with particular type of ammunition. In each of the above options system 10 causes linear motor 500 to control sliding mass 600 to generate a recoil force versus time diagram (or generate an impulse) which is different from the simulation for the type of firearm without the option selected, and which approximates the recoil of the firearm having such option.

Using Same Core Simulation System with Different Firearm Model Attachments to Provide User with Option of Better Simulating Different Types of Firearms Same core simulation system but having different firearm attachments for simulating different firearms. Here, using the same controller 50 and attached linear motor 500, have different firearm attachments (e.g., AR-15 rifle unit attachment, and Glock pistol unit attachment). Here the magnetic mass/shaft 600 slidably connected to the linear motor 500 can also be changed but keep same linear motor 500.

In various embodiments simulator 10 can include a plurality of different body attachments 20, 20', 20", etc. for simulating recoil patterns from a plurality of different type firearms, each of the plurality of body attachments being interchangeably operably connectable with linear motor 500. In various embodiments, each of the plurality of body attachments 20, 20', 20", etc. can include unique identifiers that inform controller 50 in the selection of one of a plurality of predefined sets of recoil simulating kinematic movements of sliding mass 600 in order to simulate a recoil pattern for the particular type of firearm that the particular body attachment represents. Based on the unique identifier of the particular body attachment 20, 20', 20", etc, operably connectable to linear motor, controller 50 can select one of the plurality of predefined sets of kinematic movement to control linear motor 500 in controlling sliding mass 600 to create a series of predefined movements for sliding mass 600 and emulate recoil for the particular type of firearm that the particular connected body attachment represents. In various embodiments the individual identifiers can be microcontrollers which, when a body attachment 20 is connected to linear motor 500, communicate with microcontroller 50 (shown in FIG. 10), and identify the particular type of firearm for which recoil is to be simulated. In one embodiment the plurality of interchangeable different type body attachments 20, 20', 20", etc. includes at a plurality of different type rifles. In one embodiment the plurality of interchangeable different type body attachments 20, 20', 20", etc. includes at a plurality of different type shotguns. In one embodiment the plurality of interchangeable different type body attachments 20, 20', 20", etc. includes at least one rifle body type and at least one shotgun body type and/or at least one pistol body type. In one embodiment the plurality of interchangeable different type body attachments 20, 20', 20", etc. includes a plurality of different type rifles and different type shotguns and/or pistols.

In various embodiments wireless/communication can be provided for one or more of the components of the method and apparatus 10 such as where the body attachment 20 and/or linear motor 500 are not hard wired to the controller 50 but these components are set up to communicate wirelessly between each other, along with one or more battery power supplies being used to power the linear motor 500 and/or controller 50 and/or other components. In one embodiment the battery power supply for the linear motor is contained in the body 20 (such as where the battery simulates an ammunition clip to be inserted into body 20).

As to a further discussion of the manner of usage and operation of the present invention, the same should be apparent from the above description. Accordingly, no further discussion relating to the manner of usage and operation will be provided.

The following is a list of reference numerals:

LIST FOR REFERENCE NUMERALS

| (Reference No.) | (Description) |
|---|---|
| 5 | user |
| 10 | firearm training simulator system |
| 20 | simulated firearm body |
| 50 | controller |
| 54 | connecting wire bus |
| 60 | power supply or supplies |
| 100 | receiver |
| 120 | upper receiver |
| 140 | lower receiver |
| 160 | pistol grip |
| 170 | trigger |
| 172 | trigger switch |
| 180 | charging handle |
| 200 | sight rail |
| 210 | rear sight |
| 220 | shoulder stock |
| 230 | buffer tube |
| 250 | cartridge |
| 254 | cartridge release |
| 280 | the adjustment lever |
| 300 | barrel assembly |
| 310 | barrel |
| 320 | barrel bore |
| 330 | upper handguard |
| 340 | lower handguard |
| 350 | rail |
| 360 | front sight |
| 370 | flash hider |
| 400 | bolt |
| 450 | selector interface switch |
| 452 | off position |
| 454 | semi automatic position |
| 456 | burst position |
| 458 | fully automatic position |
| 500 | linear motor |
| 504 | linear motor logic controller |
| 510 | driving portion |
| 520 | plurality of controllable energized coils |
| 521 | controllable coil |
| 522 | controllable coil |
| 523 | controllable coil |
| 524 | controllable coil |
| 525 | controllable coil |
| 526 | controllable coil |
| 530 | first end of plurality of coils |
| 534 | second end of plurality of coils |
| 540 | fastener openings |
| 550 | sensor |
| 552 | sensor |
| 600 | driven mass |
| 610 | first end |
| 620 | second end |
| 630 | bore |
| 640 | plurality of magnets |
| 641 | spacer |
| 642 | magnet |
| 643 | spacer |
| 644 | magnet |
| 645 | spacer |
| 646 | magnet |
| 650 | stop |
| 660 | length of travel for driven mass |
| 666 | position of second end of driven mass with respect to length of travel |
| 700 | support for linear motor |
| 710 | first end |
| 720 | second end |
| 721 | first connector flange |
| 722 | second connector flange |
| 730 | openings |
| 732 | openings |
| 740 | tubular section |
| 750 | bore |
| 800 | stop |

LIST FOR REFERENCE NUMERALS

| (Reference No.) | (Description) |
|---|---|
| 810 | first end |
| 820 | second end |
| 1000 | trigger switch |
| 1100 | clip switch |
| 1200 | laser emitter |
| 1210 | wires |
| 1220 | first laser path |
| 1221 | location of hit for first laser path |
| 1230 | second laser path |
| 1231 | location of hit for second laser path |
| 1240 | third laser path |
| 1241 | location of hit for third laser path |
| 1300 | arrow |
| 1310 | arrow |
| 1320 | arrow |
| 1330 | arrow |
| 1350 | arrow |
| 1400 | target area |
| 1410 | non-target area |
| 1500 | actual recoil force diagram |
| 1502 | actual acceleration diagram |
| 1504 | actual position diagram |
| 1520 | peak actual recoil force |
| 1522 | value of peak recoil force |
| 1600 | simulated recoil force diagram |
| 1602 | simulated acceleration diagram |
| 1604 | simulated position diagram |
| 1610 | spike in force diagram caused by mechanical stop |
| 1620 | peak force |
| 1630 | difference between peak actual recoil force and peak generated recoil force |
| 1700 | time at which slider first impacts mechanical stop |

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

What is claimed is:
1. A recoil simulation system, comprising:
a body;
a linear motor attached to the body and including a sliding mass; and
a controller in communication with the linear motor and having a programmed recoil impulse value,
wherein the controller communicates the recoil impulse value to the linear motor and the motor drives the sliding mass such that it produces a reaction force to the body that simulates the recoil impulse value.

2. The recoil simulation system of claim 1, further comprising a mechanical stop, wherein the sliding mass is driven against the mechanical stop to simulate the reaction force.

3. The recoil simulation system of claim 2, wherein the mechanical stop is attached to the body.

4. The recoil simulation system of claim 1, wherein the body is at least one of a pistol and a rifle.

5. The recoil simulation system of claim 1, further comprising a power unit that supplies power to at least one of the linear motor and the controller.

6. The recoil simulation system of claim 5, wherein the power unit includes a battery.

7. The recoil simulation system of claim 6, wherein the power unit is in the form of an ammunition clip that is securable to the body.

8. The recoil simulation system of claim 5, wherein the power unit is remotely connected to the body via a power cable.

9. The recoil simulation system of claim 5, wherein at least one of the power unit and controller are attached to, or form part of, the body.

10. The recoil simulation system of claim 5, wherein the power unit removably attaches to the body and powers the controller and the linear motor.

11. The recoil simulation system of claim 1, wherein the controller is located within the body and the body is a tetherless firearm.

12. The recoil simulation system of claim 5, wherein the body is a firearm remotely tethered to at least one of the controller and the power unit.

13. The recoil simulation system of claim 1, further comprising a sensor operatively connected to the linear motor, wherein the sensor communicates at least one of a signal representing a velocity, an acceleration, and a linear position of the sliding mass to the controller.

14. The recoil simulation system of claim 1, wherein the sliding mass includes a plurality of permanent magnets linearly aligned adjacent to each other with like poles facing like poles.

15. The recoil simulation system of claim 1, wherein the linear motor includes a plurality of independently controllable magnetic coils that are each independently controllable regarding timing and in each coil control at least one of the amount of current flow and direction of current flow.

16. The recoil simulation system of claim 15, wherein each of the plurality of independently controllable magnetic coils includes a plurality of sub-coil sections that are spaced apart from each other and connected electrically in series, wherein the electrically serially connected spaced apart sub-coil sections forming a single independently controllable magnetic coil.

17. The recoil simulation system of claim 16, wherein at least one sub-coil of a first independently controllable magnetic coil of the plurality of coils is intermediately spaced between two spaced apart sub-coils of a second independently controllable magnetic coil of the plurality of coils.

18. The recoil simulation system of claim 1, wherein the linear motor includes a plurality of independently controllable magnetic coils which are longitudinally aligned with each other and closely spaced, wherein at least two adjacent independently controllable magnetic coils are energized to create oppositely polarized magnetic fields.

19. The recoil simulation system of claim 1, wherein the linear motor comprises a plurality of independently controllable magnetic coils which are longitudinally aligned, wherein adjacent independently controllable magnetic coils are simultaneously energized to create oppositely polarized magnetic fields.

20. The recoil simulation system of claim 1, wherein the linear motor comprises a plurality of independently controllable magnetic coils which are longitudinally aligned with each other and closely spaced and slidingly connected to the sliding mass, the sliding mass including a plurality of longitudinally aligned adjacent magnets, wherein the linear motor causes movement of the sliding mass of magnets by varying current through individual independently controllable coils in relation to the proximity of a particular magnet in the plurality of magnets to a particular coil in the plurality of independently controllable magnetic coils.

21. The recoil simulation system of claim 15, wherein the plurality of individually controllable magnetic coils in the plurality of coils include at least 2 independently controllable coils.

22. The recoil simulation system of claim 1, wherein the body is a firearm being simulated and the programmed recoil impulse value corresponds to an estimated recoil force for the firearm simulated, wherein, prior to producing the reaction force, the sliding mass is positioned in the body to provide a weight distribution corresponding to the weight distribution of the firearm being simulated.

23. The recoil simulation system of claim 1, wherein the body is a firearm and the reaction force is directed to produce a realistic firearm recoil effect by moving the sliding mass such that it imbalances the center of gravity of the body in the direction of an end user holding the firearm.

24. The recoil simulation system of claim 2, wherein the sliding mass directly contacts the mechanical stop.

25. The recoil simulation system of claim 2, wherein the sliding mass includes a retaining clip.

26. The recoil simulation system of claim 25, wherein the retaining clip is driven against a stop surface.

27. The recoil simulation system of claim 1, wherein the body is a firearm and the recoil impulse value is associated with a recoil force produced by a particular round of ammunition for the firearm.

28. The recoil simulation system of claim 27, further comprising a visualization system and a tracking system, the tracking system tracking the firearm and communicating information regarding the firearm to the visualization system.

29. The recoil simulation system of claim 28, wherein the visualization system is projection based.

30. The recoil simulation system of claim 28, wherein the tracking system is laser based.

31. The recoil simulation system of claim 29, wherein the tracking system is laser based.

32. A simulation system, comprising:
a body simulating a firearm and having a trigger;
a linear motor attached to the body and including a sliding mass;
a controller in communication with the linear motor and having a programmed recoil impulse value;
a visualization system that provides a visual effects;
a laser system attached to the body;
and
a tracking system,
wherein the trigger is operatively connected to the linear motor and the programmed recoil impulse value corresponds to an impulse value of a particular round of ammunition fired from a particular firearm being simulated, wherein activation of the trigger causes the linear motor to enter a firing emulation sequence and the controller communicates the recoil impulse value to the linear motor such that the motor drives the sliding mass and the sliding mass produces a reaction force on the body that simulates the recoil impulse value, wherein the tracking system obtains information from at least one of the laser system and the trigger and communicates the information to the visualization system whereby a change occurs in the visual effect,
wherein the trigger is attached to the body and in communication with the linear motor and at least one of the tracking system and the laser system.

33. The simulation system of claim 32, wherein the visualization system is at least one of projection based and screen based.

34. The simulation system of claim 32, wherein the tracking system includes a laser.

35. A simulation system, comprising: a plurality of body attachments; a linear motor interchangeably attachable to the body attachments; the linear motor including a sliding mass; a controller that controls the movement of the sliding mass such that the sliding mass produces a force on the body attachments that simulates a preprogrammed force.

36. The simulation system of claim 35, wherein the simulator includes a plurality of different sliding masses which are interchangeably connectable with the linear motor.

37. The simulation system of claim 35, wherein the plurality of body attachments are each different types of firearms.

38. The simulation system of claim 35, wherein the controller is integrated with the interchangeably attachable linear motor such that the linear motor and the controller form a single unit that is interchangeably attachable to each body attachment.

39. The simulation system of claim 35, further comprising additional controllers, each controller at least one of integrated with each separate body attachment and tethered to each separate body attachment.

40. The simulation system of claim 37, further comprising a mechanical stop, wherein the sliding mass is driven against the mechanical stop.

\* \* \* \* \*